US012317362B2

(12) United States Patent
Latheef et al.

(10) Patent No.: US 12,317,362 B2
(45) Date of Patent: *May 27, 2025

(54) METHOD AND APPARATUS FOR PERFORMING RRC STATE TRANSITION IN WIRELESS COMMUNICATION NETWORK

(71) Applicant: Samsung Electronics Co., Ltd., Suwon-si (KR)

(72) Inventors: Fasil Abdul Latheef, Calicut (IN); Mangesh Abhimanyu Ingale, Bangalore (IN); Himke Van Der Velde, Zwolle (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,961

(22) Filed: Oct. 9, 2023

(65) Prior Publication Data
US 2024/0049339 A1 Feb. 8, 2024

Related U.S. Application Data

(63) Continuation of application No. 16/834,868, filed on Mar. 30, 2020, now Pat. No. 11,785,664.

(30) Foreign Application Priority Data

Mar. 29, 2019 (IN) .............................. 201941012734
Mar. 27, 2020 (IN) .............................. 202042013381

(51) Int. Cl.
*H04W 76/27* (2018.01)
*H04W 76/28* (2018.01)
*H04W 76/30* (2018.01)

(52) U.S. Cl.
CPC ........... *H04W 76/27* (2018.02); *H04W 76/28* (2018.02); *H04W 76/30* (2018.02)

(58) Field of Classification Search
CPC ..... H04W 76/27; H04W 76/28; H04W 76/30; H04W 76/38

See application file for complete search history.

(56) References Cited

U.S. PATENT DOCUMENTS

2011/0249575 A1* 10/2011 Dwyer ................. H04W 76/27
370/252
2014/0016614 A1* 1/2014 Velev .................... H04W 76/10
370/331

(Continued)

FOREIGN PATENT DOCUMENTS

WO 2018170516 A2 9/2018

OTHER PUBLICATIONS

Oppo, "Consideration on UE indicating to transition out of RRC_CONNECTED state", 3GPP TSG-RAN WG2 Meeting #107, Aug. 26-30, 2019, R2-1908776, 3 pages.

(Continued)

*Primary Examiner* — Will W Lin

(57) ABSTRACT

A method for triggering a RRC state transition indication by UE in a wireless communication network includes receiving, by the UE, a radio resource control (RRC) Reconfiguration message from the wireless communication network, where the RRC Reconfiguration message comprises a configuration setting. Further, the method includes enabling, by the UE, a capability to trigger a RRC state transition indication to the wireless communication network based on the configuration setting and determining, by the UE, a condition to trigger the RRC state transition indication to the wireless communication network is satisfied. Further, the method includes triggering, by the UE, the RRC state transition indication by sending a UE assistance information message to the wireless communication network.

16 Claims, 13 Drawing Sheets

(56) References Cited

U.S. PATENT DOCUMENTS

| | | | |
|---|---|---|---|
| 2014/0044029 A1* | 2/2014 | Chou | H04W 52/0216 |
| | | | 370/331 |
| 2014/0235229 A1* | 8/2014 | Hwang | H04W 76/38 |
| | | | 455/418 |
| 2015/0341786 A1 | 11/2015 | Wang | |
| 2018/0084601 A1* | 3/2018 | Dhanapal | H04W 76/30 |
| 2018/0103398 A1* | 4/2018 | Jung | H04W 76/19 |
| 2018/0176834 A1* | 6/2018 | Wei | H04W 36/0066 |
| 2018/0270892 A1* | 9/2018 | Choi | H04W 36/34 |
| 2018/0310343 A1 | 10/2018 | Fujishiro | |
| 2019/0053324 A1* | 2/2019 | Tseng | H04W 76/30 |
| 2019/0254104 A1* | 8/2019 | Gurumoorthy | H04W 76/27 |
| 2019/0349838 A1* | 11/2019 | Futaki | H04W 74/002 |
| 2019/0349881 A1* | 11/2019 | Choi | H04W 4/02 |
| 2020/0205220 A1* | 6/2020 | Lee | H04W 76/38 |

OTHER PUBLICATIONS

Ericsson, "Offline #506 Release assistance", 3GPP TSG-RANS Meeting #107bis, Oct. 14-18, 2019, R2-1914058, 8 pages.
MediaTek Inc., "Open issues related to the running 38.331 CR", 3GPP TSG-RAN WG2 Meeting #108, Nov. 18-22, 2019, R2-1915549, 1 page.
International Search Report and Written Opinion of the International Searching Authority in connection with International Patent Application No. PCT/KR2020/004326 dated Jul. 9, 2020, 10 pages.
3GPP TS 36.331 V15.4.0 (Dec. 2018), Technical Specification, 3rd Generation Partnership Project, Technical Specification Group Radio Access Network, Evolved Universal Terrestrial Radio Access (E-UTRA), Radio Resource Control (RRC), Protocol Specification (Release 15) Dec. 2018, 933 pages.

* cited by examiner

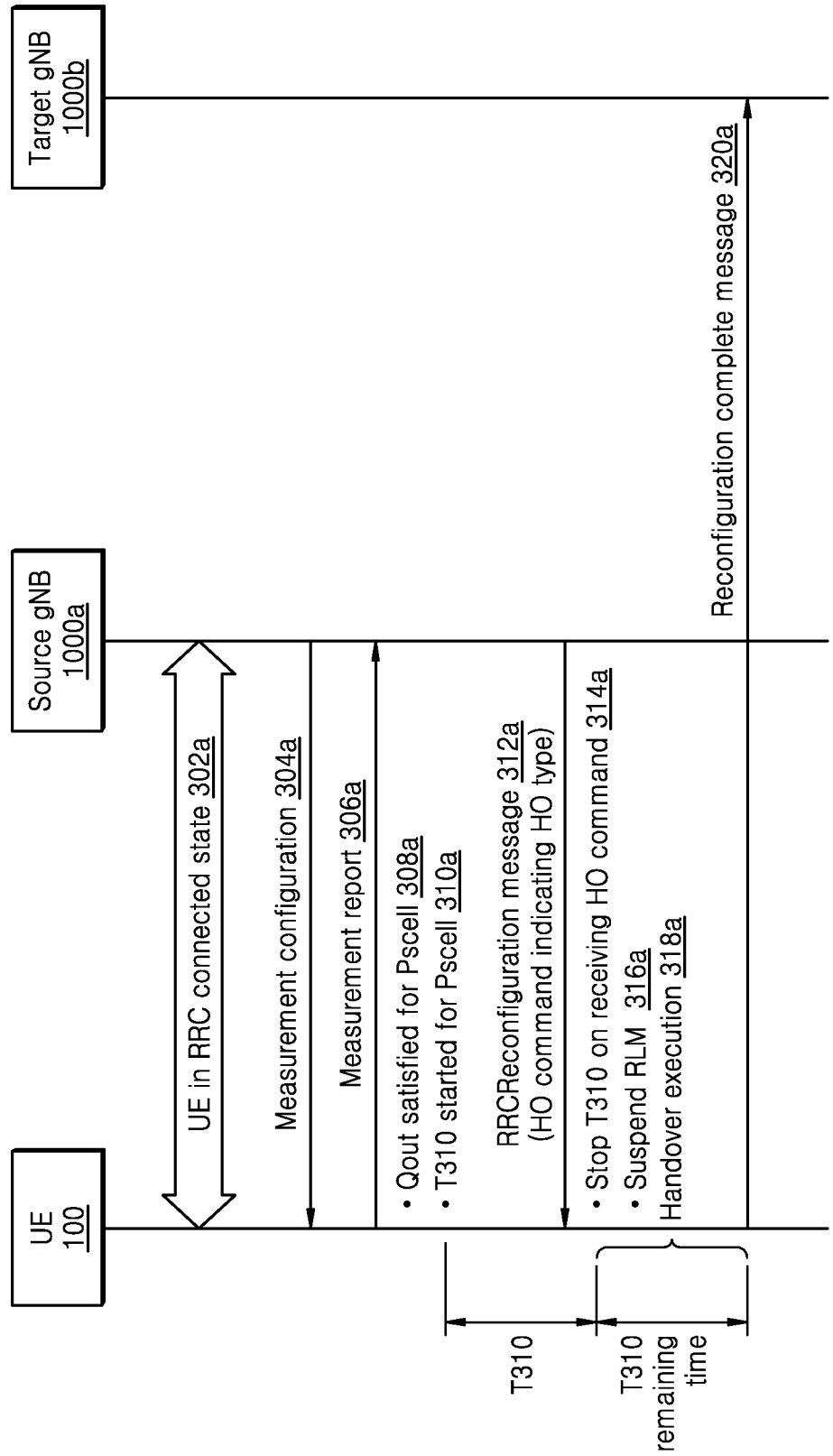

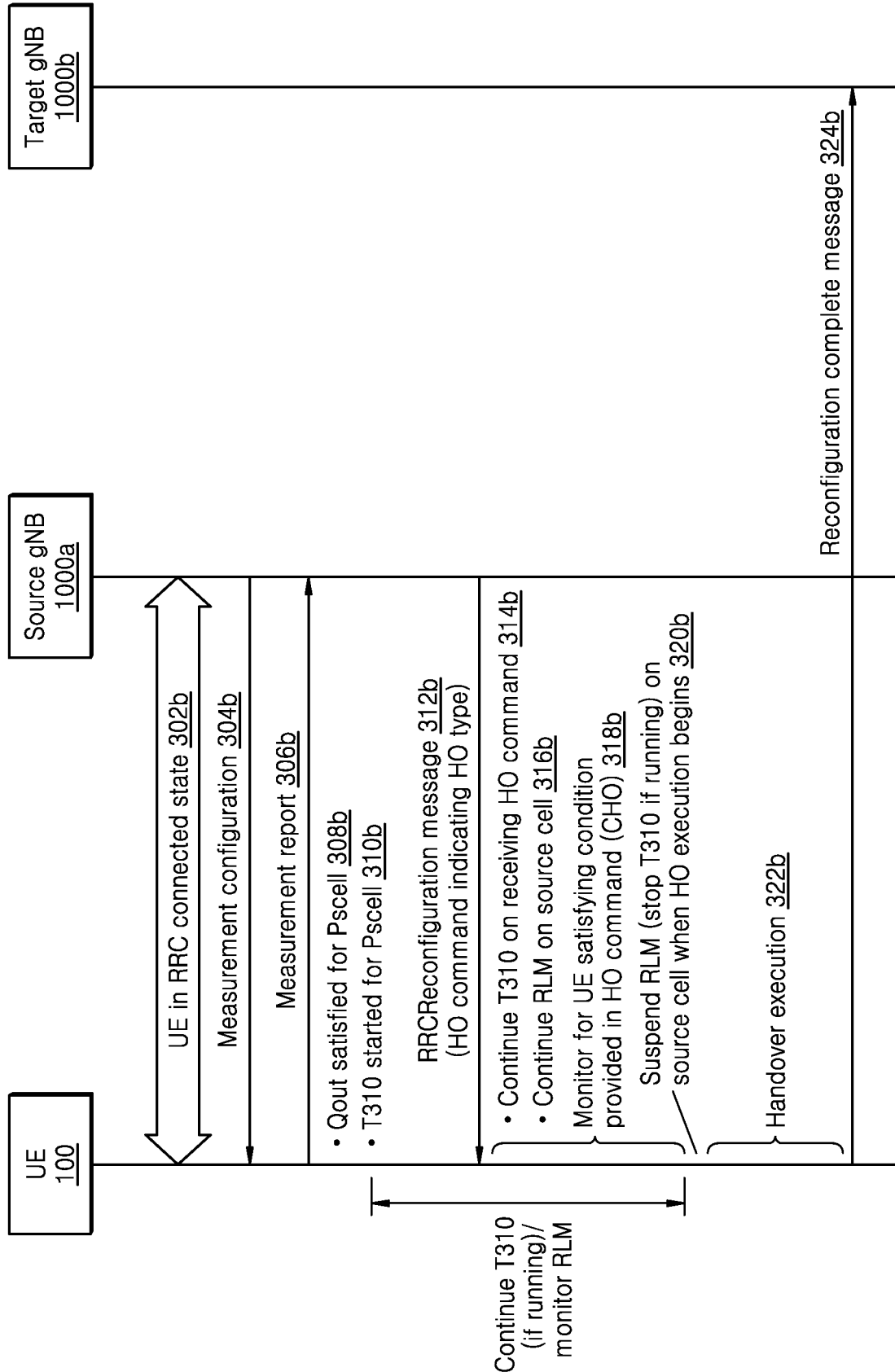

METHOD AND APPARATUS FOR PERFORMING RRC STATE TRANSITION IN WIRELESS COMMUNICATION NETWORK

CROSS-REFERENCE TO RELATED APPLICATIONS

This application is a continuation of Ser. No. 16/834,868 filed Mar. 30, 2020, now U.S. Pat. No. 11,785,664 issued Oct. 10, 2023, which is based on and claims priority under 35 U.S.C. § 119 to Indian Patent Application No. 201941012734 filed on Mar. 29, 2019, and Indian Patent Application No. 202042013381 filed on Mar. 27, 2020 in the Indian Intellectual Property Office, the disclosures of which are herein incorporated by reference in their entirety.

BACKGROUND

1. Field

The present disclosure relates to wireless communication, and more particularly to a method and a user equipment (UE) for triggering a RRC state transition indication in a wireless communication network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human-centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

Certain embodiments according to this disclosure provide a method and a user equipment (UE) for triggering RRC state transition indication in wireless communication network.

Certain embodiments according to this disclosure enable the UE to send a RRC state transition indication to the wireless communication network based on a configuration setting received in the RRC Reconfiguration message.

Certain embodiments according to this disclosure determine that a condition to trigger the RRC state transition indication to the wireless communication network is satisfied.

Certain embodiments according to this disclosure trigger the RRC state transition indication by sending a UE assistance information message to the wireless communication network.

Certain embodiments according to this disclosure to append a preferred RRC state of the UE in the UE assistance information message.

Certain embodiments according to this disclosure receive a RRC reconfiguration message comprising a handover configuration from a source cell of the wireless communication network.

Certain embodiments according to this disclosure determine that a CHO configuration which includes a plurality of conditions for performing the CHO and a plurality of target cell configurations is provided in the handover configuration.

Certain embodiments according to this disclosure continue a RLM timer and a radio link monitoring procedure on the source cell, in response to determining that the CHO configuration is provided in the handover configuration; and stop the RLM timer and suspend the radio link monitoring procedure on the source cell, in response to determining that the CHO configuration is not provided in the handover configuration.

Certain embodiments according to this disclosure execute the CHO from the source cell to a candidate target cell of the plurality of target cells in the wireless communication network based on the CHO configuration.

Certain embodiments according to this disclosure suspend the RLM timer and the radio link monitoring procedure on the source cell when the condition for executing the CHO from the source cell to the candidate target cell is fulfilled.

Various embodiments described herein include a method for triggering a RRC state transition indication by UE in a wireless communication network. The method includes receiving, by the UE, a radio resource control (RRC) Reconfiguration message from the wireless communication network, where the RRC Reconfiguration message comprises a configuration setting. Further, the method includes enabling, by the UE, a capability to trigger a RRC state transition indication to the wireless communication network based on the configuration setting and determining, by the UE, a condition to trigger the RRC state transition indication to the wireless communication network is satisfied. Further, the method includes triggering, by the UE, the RRC state transition indication by sending a UE assistance information message to the wireless communication network.

In various embodiments according to this disclosure, enabling, by the UE, the capability to trigger the RRC state transition indication to the wireless communication network based on the configuration setting includes activating, by the UE, the condition to trigger the RRC state transition indication based on the RRC Reconfiguration message which enables the capability to send the UE assistance information for indicating RRC state transition, wherein the condition is one of: a timer based threshold and a counter based threshold.

In various embodiments according to this disclosure, the activated condition based on the timer threshold is one of: determining, by the UE, that the UE is explicitly configured with a dataInactivityTimer; configuring, by the UE, an inactiveIndicationTimer when the UE is not explicitly configured with the dataInactivityTimer; and determining, by the UE, that a threshold condition as a percentage of time for one of: the dataInactivityTimer and the inactiveIndicationTimer is met when said timer is running.

In various embodiments according to this disclosure, the activated condition based on the counter threshold comprises: determining, by the UE, a drxInactivityTimer is not started at least once on activating the trigger condition and a configured number of DRX cycles is elapsed without one of transmission or reception between the UE and the wireless communication network, wherein the drxInactivityTimer is part of a RRC_CONNECTED state DRX cycle configuration.

In various embodiments according to this disclosure, configuring, by the UE, the inactiveIndicationTimer when the UE is not explicitly configured with the dataInactivityTimer includes determining, by the UE, that the UE is not explicitly configured with the dataInactivityTimer by the wireless communication network. Further, the method includes configuring, by the UE, the UE with the inactiveIndicationTimer, wherein a condition to one of: start the inactiveIndicationTimer and re-start the inactiveIndicationTimer is the same as the condition to one of: start the dataInactivityTimer and re-start the dataInactivityTimer.

In various embodiments according to this disclosure, triggering, by the UE (100), the RRC state transition indication by sending the UE assistance information message to the wireless communication network includes determining, by the UE (100), whether a preferred RRC state of the UE (100) to switch from the RRC_CONNECTED state is available. Further, the method includes performing, by the UE (100), one of: appending the preferred RRC state of the UE (100) in the UE assistance information message and sending the UE assistance information message to the wireless communication network, in response to determining that the preferred RRC state of the UE (100) to switch from the RRC_CONNECTED state is available, and sending the UE assistance information message to the wireless communication network without the preferred RRC state of the UE (100), in response to determining that the preferred RRC state of the UE (100) to switch from the RRC_CONNECTED state is unavailable.

In various embodiments according to this disclosure, the preferred RRC state of the UE (100) is RRC_INACTIVE.

In various embodiments according to this disclosure, when the preferred RRC state of the UE (100) is unavailable, the state transition indicates one of a: RRC_INACTIVE and RRC_IDLE.

Accordingly certain embodiments as described herein include user equipment (UE) for triggering a RRC state transition indication in a wireless communication network. The UE includes a communicator, a memory, and a processor. The communicator is configured to receive a radio resource control (RRC) Reconfiguration message from the wireless communication network, where the UE is in a RRC_CONNECTED state and where the RRC Reconfiguration message comprises a configuration setting. The processor is configured to enable a capability to trigger a RRC state transition indication to the wireless communication network based on the configuration setting. Further, the processor is also configured to determine a condition to trigger the RRC state transition indication to the wireless communication network is satisfied; and trigger the RRC state transition indication by sending a UE assistance information message to the wireless communication network.

Accordingly certain embodiments as described herein include a method for executing conditional handover by UE in a wireless communication network. The method includes receiving a RRC reconfiguration message from a source cell of the wireless communication network. The RRC reconfiguration message comprises a handover configuration and determining whether a CHO configuration is provided in the handover configuration. The CHO configuration comprises a plurality of conditions for performing the CHO and a plurality of target cell configurations. Further, the method includes performing one of: continuing a RLM timer and a RLM procedure on the source cell, in response to determining that the CHO configuration is provided in the handover configuration; and stopping the RLM timer and suspending the radio link monitoring procedure on the source cell, in response to determining that the CHO configuration is not provided in the handover configuration. The method then includes executing the CHO from the source cell to a candidate target cell of the plurality of target cells in the wireless communication network based on the CHO configuration.

Accordingly certain embodiments as described herein include user equipment (UE) for executing conditional handover in a wireless communication network, the UE includes a communicator, a memory, and a processor. The communicator is configured to receive a RRC reconfiguration message from a source cell of the wireless communication network, where the UE is in a RRC connected state and where the RRC reconfiguration message comprises a handover configuration. The processor is configured to determine whether a conditional handover (CHO) configuration is provided in the handover configuration, where the CHO configuration comprises a plurality of conditions for performing the CHO and a plurality of target cell configurations. Further, the processor is also configured to perform one of: continue a radio link monitoring (RLM) timer and a radio link monitoring procedure on the source cell, in response to determining that the CHO configuration is provided in the handover configuration; and stop the RLM timer and suspending the radio link monitoring procedure on the source cell, in response to determining that the CHO configuration is not provided in the handover configuration. Further, the processor is also configured to execute the CHO from the source cell to a candidate target cell of the plurality of target cells in the wireless communication network based on the CHO configuration.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3A illustrates an example of signaling for suspension of a radio link monitoring (RLM) timer immediately on receiving a handover command (HO);

FIG. 3B illustrates an example of signaling for a continuation of the RLM timer on a source cell till HO execution based on a CHO configuration provided in the HO command, according to certain embodiments of this disclosure;

DETAILED DESCRIPTION

Figure 1A:
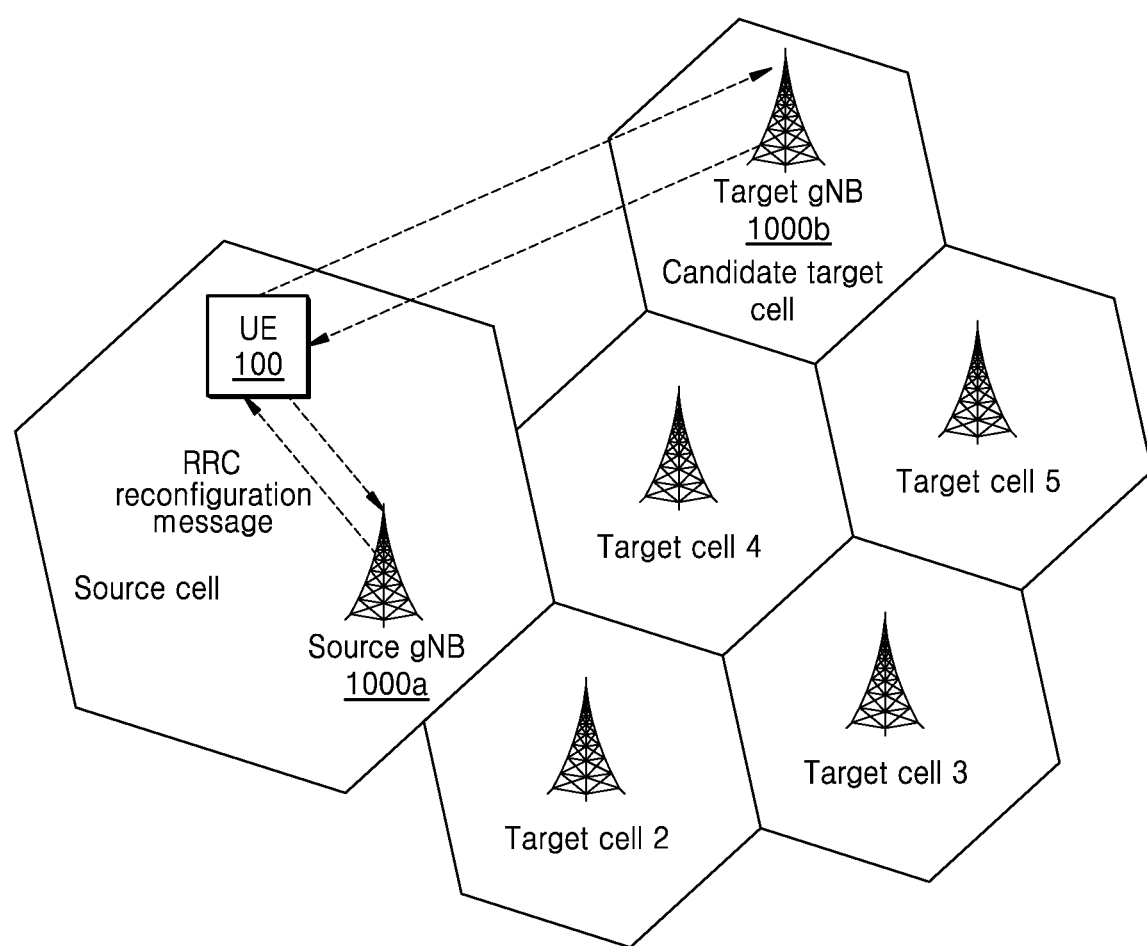
FIG. 1A illustrates an example of a system for executing conditional handover (CHO) in a wireless communication network, according to certain embodiments of this disclosure.

FIGS. 1A through 7C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments described herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

In view of the specification, the terms wireless communication network and network may be used interchangeably throughout the specification, and should be interpreted to mean one and the same. The terms source cell and source node may be used interchangeably throughout the specification, and are to mean one and the same. The terms target cell and target node may be used interchangeably throughout the specification, and are to mean one and the same.

In general, with an increased number of users of wireless communication network, the need to provide undisrupted and high quality of service to the users is of prime importance for the telecom industry.

The wireless communication network supports communication for a plurality of user equipments (UE). Each UE communicates with one or more base stations via transmissions on forward link and reverse link. The forward link (or downlink) refers to a radio link from the base stations to the UE, and the reverse link (or uplink) refers to the radio link from the UE to the base stations. In the wireless communication network, radio link monitoring (RLM) is a mechanism for the UE to monitor quality of the downlink (DL) for determining if the radio link is good enough to continue transmission.

The base station of a source cell in which the UE is currently located, facilitates communications of the UE. Due to mobility, the UE may enter into coverage area associated with another eNB which may be able to serve the UE better. However, the UE needs to perform handover procedure from the eNB serving the source cell to a new eNB. In conventional mobility procedures, when the UE receives a handover command, the UE suspends the radio link monitoring (i.e. RLM timer T310 is stopped). Further, the handover procedure towards a target cell is initiated immediately on reception of the handover command from the wireless communication network. An aspect of improved mobility robustness during the handover procedure is conditional Handover (CHO) which is agreed to be supported on both long term evolution (LTE) and New Radio (NR). In the CHO scenario, a candidate cell (or a potential target cell) is configured to the UE using a CHO configuration received as part of the handover command and then the CHO execution is initiated based on the UE satisfying a network configured condition. Unlike the conventional handover procedures, the UE in the CHO does not perform the handover execution immediately on receiving the handover command from the wireless communication network. Therefore, if the RLM is suspended (or if the T310 is stopped, if the T310 running), the UE may be forced to be latched on to a weak cell without being able to recover and hence become inefficient. During the CHO execution, the UE however continues to receive signals from a source cell based on a radio/RF capability. If the RLM is performed (e.g., if the T310 is not stopped, if the T310 running) during the CHO execution time, then the UE encounters a radio link failure (RLF) in the wireless communication network.

Another aspect of the UE which needs to be addressed in order to achieve higher efficiency is reduction in power consumption by the UE. The reduction in power consumption for the UE is achieved by use of mechanisms like Discontinuous Reception (DRX), over heating assistance etc. In LTE systems, the UE is configured to send power preference indication (PPI), which has a very generic purpose that the wireless communication network interprets as the UE is requesting optimized power consumption. However, a scenario of a transition of the UE from a radio resource control (RRC) CONNECTED state to one of: a RRC IDLE state or a RRC INACTIVE state is based on the discretion of the wireless communication network. There is no feedback from the UE and hence a higher possibility of increased and inefficient power consumption by the UE.

According to existing standard specifications, there is no mechanism by which the UE can indicate to the wireless communication network that radio resource control (RRC) connection can be released, thereby reducing a possible the power consumption. Even if there is no data transfer ongoing with the UE, the wireless communication network still maintains the RRC connection for duration of an inactivity timer. The inactivity timer is not defined in existing standard specification but a parameter maintained by the wireless communication network which is implementation specific. However, many wireless communication networks use the inactivity timer and do not release the RRC connection immediately in order to ensure that there are no frequent requests for the RRC connection from the UE resulting is unnecessary power consumption.

Thus, there are opportunities in the art for addressing the above mentioned disadvantages or other shortcomings or at least provide a useful alternative.

Accordingly certain embodiments as described herein include a method for triggering a RRC state transition indication by UE (100) in a wireless communication network. The method includes receiving, by the UE (100), a radio resource control (RRC) Reconfiguration message from the wireless communication network, where the RRC Reconfiguration message comprises a configuration setting. Further, the method includes enabling, by the UE (100), a capability to trigger a RRC state transition indication to the wireless communication network by activating at least one condition at the UE (100) based on the configuration setting, where the at least one condition is one of: a timer based threshold and a counter based threshold. Further, the method also includes and determining, by the UE (100), that the at least one condition to trigger the RRC state transition indication to the wireless communication network is satisfied and triggering, by the UE (100), the RRC state transition indication by sending a UE assistance information message to the wireless communication network.

Attention is directed to the illustrative examples provided in FIGS. 1A through 7C. For convenience, similar reference characters denote corresponding features consistently throughout the figure.

FIG. 1A illustrates an example of a system for executing a conditional handover (CHO) in a wireless communication network, according to certain embodiments of this disclosure.

Referring to the non-limiting example of FIG. 1A, the system for executing the CHO in the wireless communication network includes the UE (100), a source gNB (1000a) of a source cell within the ambit of which the UE (100) is located, a Target gNB (1000b) of a candidate target cell and a plurality of target cells. The UE (100) is mobile and is in a RRC connected state with the source gNB (1000a). Due to the mobility, the UE (100) moves closer to a coverage area associated with the candidate target cell which provides better signal strength, and the UE (100) needs to execute a handover from the source gNB (1000a) to the target gNB (1000b). Radio link monitoring (RLM) is a continuous procedure performed by the UE (100) to monitor quality of a downlink (DL) to continue transmission. The UE (100) is indicated to execute the handover by sending an RRC reconfiguration message from the source cell.

Unlike certain methods and systems, in certain embodiments according to this disclosure, the UE (100) does not initiate the handover procedure/CHO immediately on reception of a handover command from the wireless communication network. Also, the UE (100) does not suspend the RLM procedure on the source cell (i.e. RLM timer T310 is not stopped) and hence continues to be latched to the source cell even when the handover procedure is initiated.

Therefore, the UE (100) is not necessarily forced to be latched on to a weak cell without thereby providing better efficiency. Further, in the proposed method during the CHO execution, the UE (100) suspends the RLM (i.e. RLM timer T310 is stopped, if the RLM timer T310 is running) during the CHO execution time which ensures that the UE (100) does not encounter a radio link failure (RLF) in the wireless communication network.

Figure 1B:
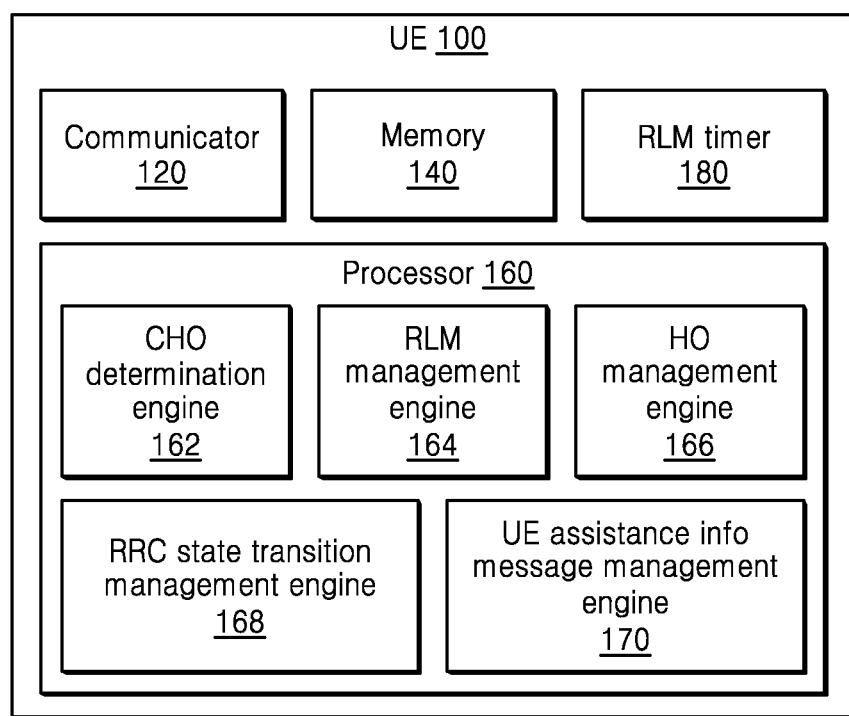
FIG. 1B illustrates, in block diagram format, an example of a user equipment (UE) for executing the CHO in the wireless communication network, according to certain embodiments of this disclosure.

FIG. 1B illustrates, in block diagram format, an example of a UE (100) for executing the CHO in the wireless communication network, according to certain embodiments of this disclosure.

Referring to the explanatory example of FIG. 1B, the UE (100) can be, for example, a mobile phone, a smart phone, Personal Digital Assistant (PDA), a tablet, a wearable device, or the like. In various embodiments according to this disclosure, the UE (100) can include a communicator (120), a memory (140), a processor (160) and a RLM timer (180). The UE (100) is in a RRC connected state.

In various embodiments according to this disclosure, the communicator (120) is configured to receive a Radio Resource Control (RRC) reconfiguration message from a source cell of the wireless communication network. The RRC reconfiguration message comprises a handover configuration. The handover configuration is a set of instructions used to configure parameters and settings of the UE (100) to enable the UE (100) to execute the handover from the source cell to a target cell. Further, the handover configuration also includes the target cell configuration that the UE (100) shall apply on a candidate target cell once handover procedure is successfully completed.

In some embodiments, the communicator (120) is also configured to receive a RRC Reconfiguration message comprising a configuration setting. In the absence of the configuration setting, the UE (100) is incapable of sending a state transition indication to the wireless communication network. The configuration setting includes information to the UE (100) that the UE (100) is allowed to send state transition request to the wireless communication network. The memory (140) can include non-volatile storage elements. Examples of such non-volatile storage elements may include magnetic hard discs, optical discs, floppy discs, flash memories, or forms of electrically programmable memories (EPROM) or electrically erasable and programmable (EE-PROM) memories. In addition, the memory (140) may, in some examples, be considered a non-transitory storage medium. The term "non-transitory" may indicate that the storage medium is not embodied in a carrier wave or a propagated signal. However, the term "non-transitory" should not be interpreted that the memory (140) is non-movable. In some examples, the memory (140) is configured to store larger amounts of information than the memory. In certain examples, a non-transitory storage medium may store data that can, over time, change (e.g., in Random Access Memory (RAM) or cache).

In various embodiments according to this disclosure, the processor (160) includes a CHO determination engine (162), a RLM management engine (164), a HO management engine (166), a RRC state transition management engine (168), a timer management engine (170) and a UE assistance info message management engine (170).

In various embodiments according to this disclosure, the CHO determination engine (162) is configured to determine that a conditional handover (CHO) configuration is provided in the handover configuration. The CHO configuration includes a plurality of conditions for performing the CHO and a plurality of target cell configurations associated with the plurality of target cells. The plurality of target cell configurations is carried in the RRC reconfiguration message as an OCTET string. The CHO configuration is, in certain embodiments, a delta configuration which details changes that are required to a current source cell configuration in order to configure the target cell and execute the handover i.e. the target cell configuration is the combination of the current source configuration and the delta configuration included in the CHO configuration. However, the source cell cannot alter the plurality of target cell configurations in the CHO configuration.

In various embodiments according to this disclosure, the RLM management engine (164) is configured to continue a radio link monitoring (RLM) timer (180) and a radio link monitoring procedure on the source cell on determining that the CHO configuration is provided in the handover configuration. The RLM management engine (164) is configured to stop the RLM timer (180) and suspend the radio link monitoring procedure on the source cell on determining that the CHO configuration is not provided in the handover configuration. The RLM timer (180) is a T310 timer. Further, the RLM management engine (164) receives an indication from the HO management engine (166) to suspend the RLM timer (180) and the radio link monitoring procedure on the source cell when the condition for executing the CHO is fulfilled, and suspend the RLM timer (180) and the radio link monitoring procedure on the source cell.

In various embodiments according to this disclosure, the HO management engine (166) is configured to determine the condition for executing the CHO from the source cell to a candidate target cell of the plurality of target cells and determine that the condition for executing the CHO is fulfilled. The condition for performing the CHO is determined and appended by the source cell to the CHO configuration.

Further, the HO management engine (166) is configured to indicate to the RLM management engine (164) to suspend the RLM timer (180) and the radio link monitoring procedure on the source cell and execute the CHO from the source cell to the candidate target cell in the wireless communication network based on the candidate target cell configuration.

In various embodiments according to this disclosure, the RRC state transition management engine (168) is configured to enable a capability to trigger a RRC state transition indication to the wireless communication network. The capability is enabled by activating the condition to trigger the RRC state transition indication based on the RRC Reconfiguration message which enables the capability to send the UE assistance information for indicating RRC state transition. The condition is one of: a timer based threshold and a counter based threshold. Further, the RRC state transition management engine (168) is configured to determine that at least one condition to trigger the RRC state transition indication to the wireless communication network is satisfied. The activated condition based on the timer threshold is one of: determining that the UE (100) is explicitly configured with a dataInactivityTimer; configuring an inactiveIndicationTimer when the UE (100) is not explicitly configured with the dataInactivityTimer; and determining that a threshold condition as a percentage of time for one of: the dataInactivityTimer and the inactiveIndicationTimer is met when said timer is running. The activated condition based on the counter threshold includes determining a drxInactivityTimer is not started at least once on activating the trigger condition and a configured number of DRX cycles is elapsed without one of transmission or reception between the UE (100) and the wireless communication network, wherein the drxInactivityTimer is part of a RRC_CONNECTED state DRX cycle configuration.

According to some embodiments, configuring of the inactiveIndicationTimer when the UE (100) is not explicitly configured with the dataInactivityTimer includes determining that the UE (100) is not explicitly configured with the dataInactivityTimer by the wireless communication network and configuring, by the UE (100), the UE (100) with the inactiveIndicationTimer. A condition to one of: start the inactiveIndicationTimer and re-start the inactiveIndicationTimer is the same as the condition to one of: start the dataInactivityTimer and re-start the dataInactivityTimer.

Further, the RRC state transition management engine (168) is configured to switch to one of: a RRC IDLE and a RRC INACTIVE state from the RRC_CONNECTED state based on a RRL release message received from the wireless communication network.

In various embodiments according to this disclosure, the UE assistance info message management engine (170) is configured to determine whether a preferred RRC state of the UE (100) to switch from the RRC_CONNECTED state is available. Further, on determining that the preferred RRC state of the UE (100) to switch from the RRC_CONNECTED state is available, the UE assistance info message management engine (170) is configured to append the preferred RRC state of the UE (100) in the UE assistance information message which is then sent to the wireless communication network. When the preferred RRC state of the UE (100) is indicated in the UE assistance information, the preferred RRC state of transition is RRC_INACTIVE state. On determining that the preferred RRC state of the UE (100) to switch from the RRC_CONNECTED state is unavailable, the UE assistance info message management engine (170) is configured to send the UE assistance information message to the wireless communication network without the preferred RRC state of the UE (100). When the preferred RRC state of the UE (100) is not indicated in the UE assistance information, the state transition indicates one of: the RRC_INACTIVE state and a RRC_IDLE state. The UE assistance information is an indication to the wireless communication network to trigger the state transition from the RRC CONNECTED state.

Although the explanatory example of FIG. 1B shows hardware elements of the UE (100), it should be understood that embodiments according to this disclosure are not limited to the configuration shown in FIG. 1B. In some embodiments, the UE (100) may include less or more number of elements. Further, the labels or names of the elements are used only for illustrative purpose and does not limit the scope of the invention. One or more components can be combined together to perform same or substantially similar function.

Figure 2A:
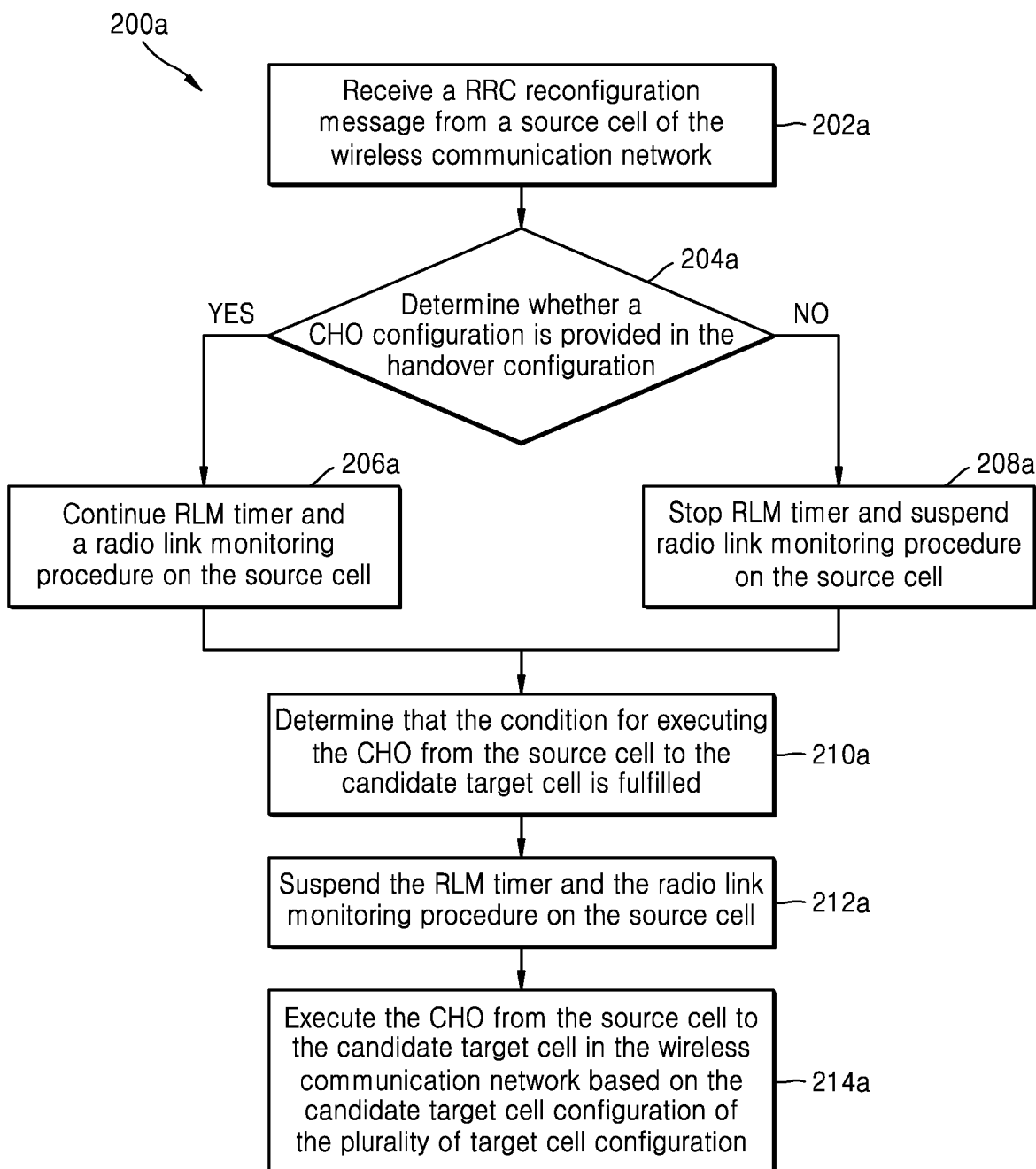
FIG. 2A illustrates aspects of an example of a method for executing the CHO by the UE in the wireless communication network, according to certain embodiments of this disclosure.

FIG. 2A illustrates, with flow chart 200a an example of a method for executing the CHO by the UE (100) in the wireless communication network, according to certain embodiments of this disclosure.

Referring to the non-limiting example of FIG. 2A, at step 202a, the UE (100) receives the RRC reconfiguration message from the source cell of the wireless communication network. For example, in the UE (100) as illustrated in FIG. 1B, the communicator (120) can be configured to receive the RRC reconfiguration message from the source cell of the wireless communication network.

In certain embodiments, at step 204a, the UE (100) determines whether the conditional handover (CHO) configuration is provided in the handover configuration. For example, in the UE (100) as illustrated in FIG. 1B, the processor (160) can be configured to determine that the conditional handover (CHO) configuration is provided in the handover configuration.

At step 206a, the UE (100) continues the radio link monitoring (RLM) timer and the radio link monitoring procedure on the source cell, in response to determining that the CHO configuration is provided in the handover configuration. For example, in the UE (100) as illustrated in FIG. 1B, the processor (160) can be configured to continue the radio link monitoring (RLM) timer and the radio link monitoring procedure on the source cell, in response to determining that the CHO configuration is provided in the handover configuration.

At step 208a, the UE (100) stops the radio link monitoring (RLM) timer (180) and suspends the radio link monitoring procedure on the source cell, in response to determining that the CHO configuration is not provided in the handover configuration. For example, in the UE (100) as illustrated in FIG. 1B, the processor (160) can be configured to stop the radio link monitoring (RLM) timer (180) and suspend the radio link monitoring procedure on the source cell, in response to determining that the CHO configuration is not provided in the handover configuration.

In various embodiments according to this disclosure, at step 210a, the UE (100) determines that the condition for executing the CHO from the source cell to the candidate target cell is fulfilled. For example, in the UE (100) as illustrated in FIG. 1B, the processor (160) can be configured to determine that the condition for executing the CHO from the source cell to the candidate target cell is fulfilled.

At step 212a, the UE (100) suspends the RLM timer (180) and the radio link monitoring procedure on the source cell. For example, in the UE (100) as illustrated in FIG. 1B, the processor (160) can be configured to suspend the RLM timer (180) and the radio link monitoring procedure on the source cell.

At step 214a, the UE (100) executes the CHO from the source cell to the candidate target cell in the wireless communication network based on the candidate target cell configuration of the plurality of target cell configuration. For example, in the UE (100) as illustrated in FIG. 1B, the processor (160) can be configured to execute the CHO from the source cell to the candidate target cell in the wireless communication network based on the candidate target cell configuration of the plurality of target cell configuration.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 2B:
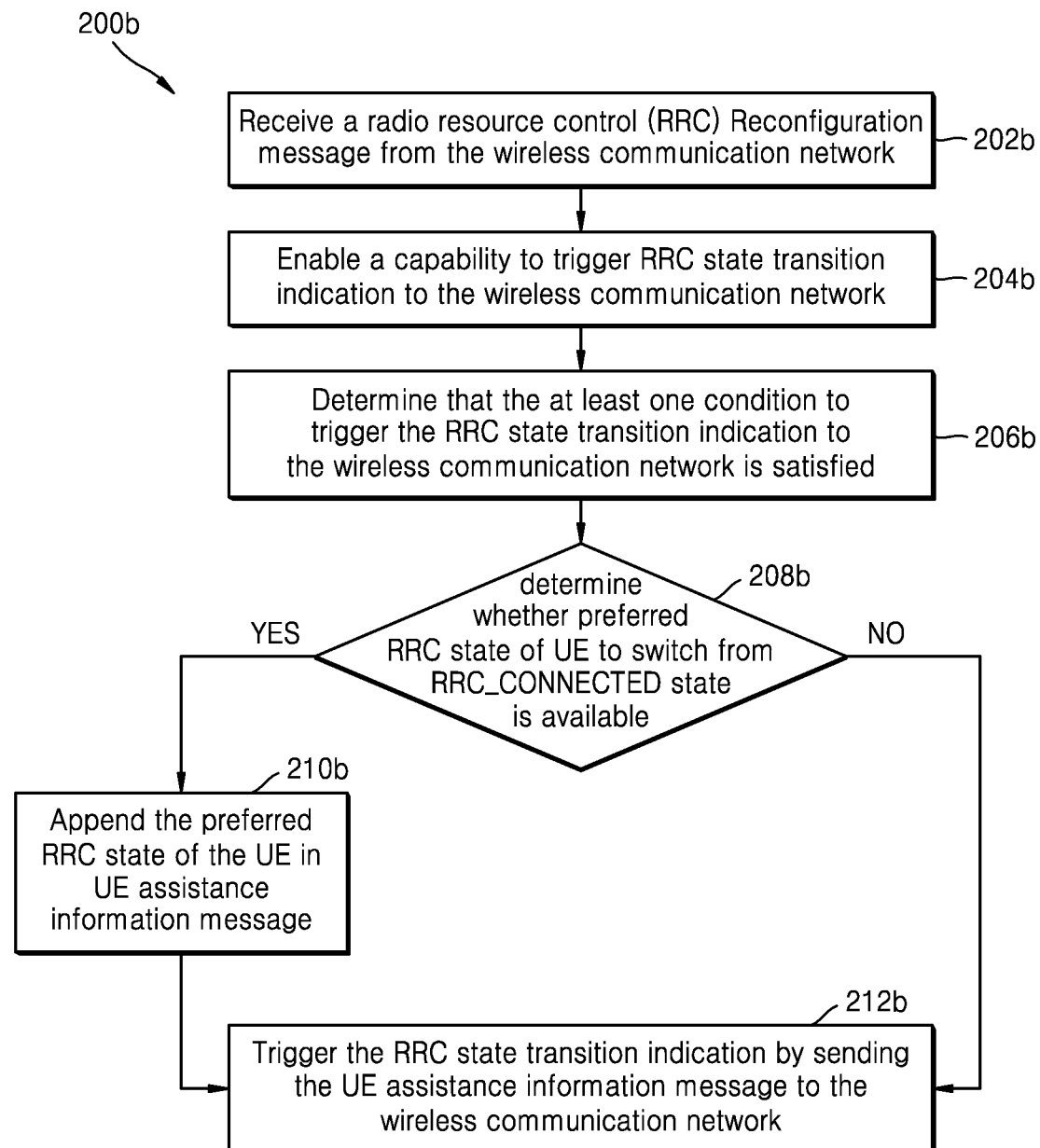
FIG. 2B illustrates aspects of an example of a method for triggering a RRC state transition indication by the UE in the wireless communication network, according to certain embodiments of this disclosure.

FIG. 2B is a flow chart 200b illustrating a method for triggering a RRC state transition indication by the UE (100) in the wireless communication network, according to certain embodiments of this disclosure.

Referring to the FIG. 2B, at step 202b, the UE (100) receives the radio resource control (RRC) Reconfiguration message from the wireless communication network. For example, the UE (100) as illustrated in FIG. 1B the communicator (120) is configured to receive the radio resource control (RRC) Reconfiguration message from the wireless communication network.

At step 204b, the UE (100) enables to send the RRC state transition indication to the wireless communication network based on the configuration setting received in the RRC Reconfiguration message. For example, the UE (100) as illustrated in FIG. 1B the processor (160) is configured to enable the UE (100) to send the RRC state transition indication to the wireless communication network based on the configuration setting received in the RRC Reconfiguration message.

At step 206b, the UE (100) determines that at least one condition to trigger the RRC state transition indication to the wireless communication network is satisfied. For example, the UE (100) as illustrated in FIG. 1B the processor (160) is configured to determine that at least one condition to trigger the RRC state transition indication to the wireless communication network is satisfied.

In some embodiments, at step 208b, the UE (100) determines whether the preferred RRC state of the UE (100) to switch from the RRC_CONNECTED state is available. For example, the UE (100) as illustrated in FIG. 1B the processor (160) is configured to determine whether the preferred RRC state of the UE (100) to switch from the RRC_CONNECTED state is available.

At step 210b, in response to determining that the preferred RRC state of the UE (100) to switch from the RRC_CONNECTED state is available, the UE (100) appends the preferred RRC state of the UE (100) in the UE assistance information message. For example, the UE (100) as illustrated in FIG. 1B the processor (160) is configured to append the preferred RRC state of the UE (100) in the UE assistance information message.

At step 212b, the UE (100) triggers the RRC state transition indication by sending the UE assistance information message to the wireless communication network. For example, the UE (100) as illustrated in FIG. 1B the processor (160) is configured to trigger the RRC state transition indication by sending the UE assistance information message to the wireless communication network.

At step 208b, in response to determining that the preferred RRC state of the UE (100) to switch from the RRC_CONNECTED state is not available, the UE (100) loops to step 212b.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

FIG. 3A illustrates an example of signaling a suspension of the RLM timer (180) by the UE (100) immediately on receiving the handover (HO) command.

Referring to the example of FIG. 3A, at step 302a, consider that the UE (100) is in the RRC connected state with the source gNB (1000a). In the RRC connected state, at step 304a, the source gNB (1000a) sends a measurement configuration to the UE (100). Further, at step 306a, the UE (100) sends measurement report to the source gNB (1000a). The measurement report comprises a current configuration associated with the UE (100). The UE (100) performs the RLM by estimating the downlink radio link quality and compare the downlink radio link quality to preset thresholds Qout for monitoring the downlink radio link quality of the source cell (Pscell) to detect a radio link failure (RLF). The preset threshold Qout is defined as a level at which the downlink radio link cannot be reliably received and shall correspond to the out-of-sync block error rate (BLERout).

Further, the UE (100) measures a Block Error Rate (BLER) of a Physical Downlink Control Channel (PDCCH) during a predetermined time period. Further, at step 308a, the UE (100) determines that the BLER drops below the preset threshold (Qout) during the predetermined time period and an out-of-sync indication is generated in a physical (PHY) layer. When a preset N310 number of successive out-of-sync indications are reported to the RRC layer by the PHY layer, the RLM timer (180) is started by the RRC layer (step 310*a*).

At step 312*a*, the source gNB (1000*a*) sends the RRCReconfiguration message to the UE (100). In the conventional methods and systems, the UE (100) in response to receiving the RRCReconfiguration message, at step 314*a*, stops the RLM timer (180) on and at step 316*a*, suspends the RLM procedure. Further, at step 318*a*, the UE (100) executes the handover from the source cell to the target cell and at step 320*a*, sends the Reconfiguration complete message to the target gNB (1000*b*).

However, the signaling in the CHO scenario is similar to signaling in the HO scenario with some changes. The HO signaling for the CHO scenario includes some limitations such as:

1) Whether to support candidate target cells controlled by different target nodes (which may affect radio signaling)
2) Whether to support candidate target cells on different carrier frequencies/MOs (which may affect the CHO configuration to be provided for the candidate)
3) Whether same handover configuration parameters can be signaled by the target node at the CHO preparation. Further, the CHO configuration may include only the most essential parameters which need to be updated in the source cell configuration.

In order to achieve the CHO, the configuration parameters are typically configured by the source node (source cell) and the target node (target cell) at the CHO configuration (i.e. in signaling towards the UE (100)) and are assumed to be known. Further, 1) the source node controls the CHO candidates which are to be configured and therefore, the source node sets:
   a) the CHO condition i.e. something based on A3 or A5 (possibly only need to indicate offset as based on the condition for measurement used to add the CHO candidate)
   b) the validity timer i.e. a timer upon the expiry of which the UE (100) releases the CHO configuration (I.e. the source node manages the plurality of the CHO candidates but may not always succeed in releasing the at least one CHO candidate of the plurality of CHO candidates)
   c) Further, the UE (100) should be allowed to set a different value for each of the CHO candidate, at least for the CHO condition.
2) The target node sets the configuration to be used when the UE (100) moves to the CHO from an initial access. However, some of the important considerations with respect to the configuration by the target node include:
   A. reconfigurationWithSync is the most essential configuration parameter and particularly:
      a) contention-free based random access (CFRA) resources (e.g. for all wide/cell specific beams, given delay between the CHO configuration and execution)
      b) PCell (dedicated and common) configuration
      c) T304 (to guard the actual CHO execution phase i.e. started after the CHO condition is achieved)
   B. the network can include other configurations such as for example: radioBearerConfig, RLC bearerConfig, MAC config, measConfig. However, to avoid the need to reconfigure, the network may only include the most essential parameters in the CHO configuration. The configuration which may not be essential are temporarily suspended/deactivated and then resumed/re-activated upon the first subsequent reconfiguration (i.e. when the network can modify)
      a) measConfig may need to be changed i.e. to continue measurements on the new primary frequency (for the case of inter-frequency CHO)
      b) If multiple CHO candidates are configured, then the other configuration may not be the same for all the candidates i.e., for example, when the candidates are on different frequencies (different measConfig) or controlled by the different target nodes (with different capabilities/typical settings).
   C. The CHO configuration is assumed to be the delta configuration compared to the current source configuration (i.e. source config as used at the time of the CHO configuration).

Further, after initiating the CHO configuration, the source node should, in this example, be able to modify the source configuration as:

I. Some reconfiguration cannot be postponed. Such as for example addition of a QoS flow or DRB upon activation of a service with specific QoS requirements
II. Some of the source reconfigurations affect the configuration to be used after the execution of the CHO such as for example if new QoS flows or DRBs are added, they should continue after the CHO configuration i.e. affect the CHO configuration.

Therefore, the specification changes for the CHO may be limited in the existing methods and systems.

In certain embodiments of this disclosure, the basic starting points for performing the conditional handover are as follows:

a) the source node (at least) sets the CHO condition and the source node should be able to configure different values for the different candidates.
b) determine whether the CHO target cell configuration should cover parameters other than the reconfigurationWithSync for example parameters such as: measConfig, radioBearerConfig and/, L2 config or not cell specific L1 config. Further, in case the CHO target cell configuration should cover the parameters, then determine whether the target node should be able to set different values for the configuration parts for the different CHO candidates.

According to some embodiments, the method for signaling the configuration changes when the source reconfiguration affects the CHO configuration requires that the source node should be able to modify the source configuration after having initiated the CHO configuration and in some cases the configuration to be used in the CHO candidate after the CHO execution is affected.

Consider a scenario where the source node initiates the configuration change that should continue after the CHO execution i.e., for example addition of a QoS flow or DRB. As indicated previously, we assume the CHO configuration is indicated by signaling the delta compared to the current source configuration (i.e. at the time of the CHO configuration).

B. To ensure the change of the source cell configuration continues after the CHO execution, the source node could either indicate the target cell of the CHO by signaling:
   a) Delta compared to the updated source cell configuration
   b) Delta compared to the previous CHO configuration In certain cases, option a) is the simplest, as the source cell configuration is the same as used at the initial CHO configuration.

Further, another issue is whether the change to the source cell configuration and the target cell configuration should be signaled together (i.e., in the same message), or can the signaling be done separately (i.e., in different messages):
1) When signaling the changes to the source cell configuration and the target cell configuration together:
   a) The changes will succeed/fail jointly (+)
   b) Will require some means to distinguish which configuration part concerns with the source CHO configuration and which part concerns with the target CHO configuration
2) When signaling the changes to the source cell configuration and the target cell configuration separately:
   a) There may be collision problems i.e. the UE (100) executes the CHO in-between the two messages. This may apply even if the two messages are transmitted together (as processing is done sequentially)

In various embodiments according to this disclosure, the CHO configuration is indicated by signaling the delta compared to the current source configuration i.e., both at the initial setup and upon reconfiguration of the CHO configuration.

In some embodiments, the conditional handover supports simultaneous reconfiguration of the source cell and the CHO configuration i.e. together within the same message.

Further, another issue is about how to signal the source cell configuration and the target cell configuration parts i.e., for example using a container/field. In some cases, both the source cell and the target cell generate some configuration parameters that are to be provided to the UE (100). There are different ways to signal the configuration parameters to the UE (100) such as: A. A regular reconfiguration message is used, including the parameters generated by the source node and by the target node. I.e. either
   A1: The source node forwards the parameters generated by the source node to the target node, which generates the Uu message including these source controlled parameters
   A2: The source node decodes the message generated by the target and adds the parameters
B. A container is added to the reconfiguration message i.e. to carry the configuration generated by the target node (alike in case of Inter Radio Access Technology handover (IRAT HO))
   B.1: Octet string/container carries the Reconfiguration message
   B.2: Octet string/container carries an IE including a subset of the fields of the Reconfiguration message.

Further, when the container is added to the reconfiguration message, the support to signal the change of the source cell configuration and the CHO candidate configuration together may be easier. Moreover, the fields which concern the CHO configuration is clearly defined. However, when the regular reconfiguration message is used to signal the configuration parameters to the UE (100), the procedure is not straightforward. In other words, in certain cases, there may be a need to introduce specific fields for the CHO candidate configuration (for example, a separate spCellConfig, measConfig). Further, the usage of the regular reconfiguration message requires specifying of the fields that the target cell can set or change as part of the CHO configuration i.e. it limits network implementation.

According to some embodiments, option B.1 is preferable and avoids the need to discuss details about which fields can be set as part of the CHO configuration and hence in the proposed method the octet string/container is added to the reconfiguration message to carry the CHO configuration generated by the target node (alike in case of IRAT HO). This octet string carries a Reconfiguration message.

Furthermore, another issue pertains to signaling the target configuration for multiple CHO candidates for example sending individual message per candidate. Also, the issues of how to signal the CHO configuration when there are multiple CHO candidates. The available techniques include signaling using:
   I: A single message
   II: A message per CHO candidate When the single message is used to signal the CHO configuration to the multiple CHO candidates, the option to include multiple spCells/reconfigurationWithSync fields needs to be added. The same applies for other fields which value may differ per CHO candidate.

The usage of separate message per CHO candidate to signal the CHO configuration to the multiple CHO candidates, provides a more flexible signaling structure:
   1) The specification changes will be limited to introducing multiple octet string containers.
   2) This option can support the CHO candidates on different target nodes
   3) The signaling is future proof Further, the issue relates to the outcome of the RAN2 being requested to review and confirm the general starting points. The issue also relates to adding the octet string/container to the reconfiguration message to carry the CHO configuration that touches the same aspect of whether or not the signaling should be flexible or restrictive.

In certain embodiments according to this disclosure, a list of octet string/containers are added to the reconfiguration message, where each of the octet string/container is carrying the CHO configuration of a single CHO candidate as generated by the target node (alike in case of IRAT HO). in certain embodiments, each octet string carries a Reconfiguration message.

The usage of separate message per CHO candidate to signal the CHO configuration to the multiple CHO candidates may result in duplicate transfer of other configuration that is the same for multiple candidates. However, the duplication of the configuration may be avoided for example by an indication that the value is the same as of another entry in the list.

According to the some embodiments, the source node (at least) sets the CHO condition and signals the CHO condition per candidate. There are 2 different ways to provide the CHO condition per candidate:
   II.1: The source node includes a CHO candidate list field, for these source controlled parameters (e.g. condition)
   II.2: The source node forwards the parameter to the target node, which includes the CHO condition in the target generated message (for each candidate)

In some cases, from the UE (100) perspective it may be simplest to not have a separate CHO candidate list field to be associated with a target generated container. In some embodiments, option II.2 may be preferable.

Therefore, in various embodiments of the proposed method, the source node forwards the CHO candidate parameters that it controls to the target node, and the target node includes it in the target generated message (per each candidate).

Another issue which needs to be addressed is about when to send the CHO complete message by the UE (100). The techniques available include:
1. Upon the CHO execution i.e. following initial access in the candidate cell (as done for the regular HO scenario), and 2. Immediately i.e. upon the CHO configuration (in which case some other signal may be needed to be sent upon the CHO execution).

In order to select the technique for sending the CHO complete message by the UE (100), the concerns about the action required upon the CHO configuration including the case in which the UE (100) is unable to comply with the CHO configuration needs to be addressed. Further, the assumption is that the UE (100) performs re-establishment, but the UE (100) may perform the action either upon the CHO configuration or upon the CHO execution. Also, there may be no real benefit in delaying re-establishment until the CHO execution. If however the UE (100) is able to comply, there seems no real need for an RRC message to confirm receipt and proper comprehension (i.e. L2 ACK seems sufficient). I.e. option 1, that is aligned with the regular HO seems sufficient.

Consider a scenario when the reconfiguration message also includes the change of the source cell configuration. Then, the UE (100) returns the complete message to confirm the source cell reconfiguration. There however seems no need to include any indication regarding the CHO reconfiguration.

In various embodiments according to this disclosure, the UE (100) returns a CHO complete message upon the execution of the CHO i.e. following initial access in the candidate cell (as for regular HO). If the message including the CHO configuration also includes a source cell reconfiguration, the UE (100) immediately returns a complete message (without explicit confirmation of receipt/comprehension of the CHO reconfiguration). In case of non-comprehension of the CHO configuration, the UE (100) immediately performs re-establishment (i.e. not delayed until the CHO execution).

In the certain types of radio link monitoring procedure performed during mobility, which are currently available in the LTE and the NR, the RLM is suspended (RLM timer (180) T310 is stopped, if the T310 is running) immediately on reception of the HO command from the network. The HO procedure is performed when the signal quality of the source cell becomes weak and the signal quality of a neighbouring cell become stronger thereby making the neighbour cell better suited to serve the UE (100). As a result, the HO command is normally signalled to the UE (100) when the signal condition of the source cell is weak. Additionally, there is a good probability that the UE (100) fails to perform handover due to the inability to successfully receive the HO command from the network due to deterioration of the serving cell signal conditions. In order to reduce handover failures caused due to the failure in receiving the HO command, early handover provisioning using CHO mechanisms are also being discussed in RAN2. Further, the HO command is signalled to the UE (100) when the serving cell signal condition is weak and there is a possibility of the HO failure due to the inability to receive the message successfully.

Consider that the UE (100) is configured with enhanced make before break (eMBB) handover then the UE (100) is expected to synchronize to the target cell and initiate random access procedure while the connection to the source cell is still active, although the signal condition may still be weak. There may be two distinct possibilities of the handover failure i.e., the source cell may encounter RLF or the target cell may encounter handover failure. However, the handover command is provided to the UE (100) when the serving cell signal conditions are detected to be getting weaker and that the neighbour cell (target cell for handover) has a better signal conditions and thereby more suitable to serve the UE (100). Therefore, the probability of encountering the radio link failure on the source cell is higher as compared to that of handover failure on the target cell. Further, the probability of encountering the radio link failure on the source cell is higher as compared to that of handover failure on the target cell in the eMBB handover.

Therefore, if the UE (100) continues to perform radio link monitoring on the source cell during HO execution period, it is possible that the UE (100) declares the RLF on the source cell due to which the UE (100) has to abort the HO execution on the target cell and will result in the UE (100) performing the re-establishment procedure. The premature suspension of the HO execution can be avoided if the UE (100) does not initiate the re-establishment procedure if the radio link failure is detected on the source cell while the handover execution on the target cell is still in progress, thereby allowing the UE (100) to continue with the handover execution on the target cell without any interruption. Alternately, the radio link monitoring on the source cell can be suspended the when handover command is received. However, both the methods are performed to achieve a similar objective and one does not appear to be better than the other.

According to certain embodiments of this disclosure, the radio link monitoring is suspended on reception of the HO command as the same is in-line with behaviour defined in specification for existing mobility mechanisms. Further, the result of suspending the radio link monitoring on the source cell on reception of the HO command from the network is similar to that of the UE (100) not initiating the re-establishment when the RLF is declared on the source cell while the HO execution to the target cell is in progress.

In various embodiments according to this disclosure, the UE (100) suspends the radio link monitoring on the source cell on receiving the HO command which includes the make before break indication. The above described UE (100) behaviour is illustrated with reference to the example of FIG. 1. This can further be applied to any handover type wherein the UE (100) executes immediate handover upon reception of the HO command from the network.

Consider the scenario when the UE (100) is configured with the conditional handover (CHO). In case of the CHO mechanism, the HO command is expected to be received much earlier than the intended time of the actual execution of the handover. The HO command is sent in advance in case of the CHO to avoid handover failure due to the UE (100) not receiving the handover command successfully. In such cases, the suspension of the radio link monitoring on the reception of the HO command from the network may not be right. Therefore, the UE (100) continues the radio link monitoring on the source cell when the CHO is configured to the UE (100). When the handover is being executed by the UE (100) on the target cell upon meeting the condition defined in the HO command, then the UE (100) should suspend the radio link monitoring on the source cell i.e. stop T310 (if running). If the RLM is continued when UE (100) initiates the handover execution on the target cell there is a risk of facing the RLF on the source cell resulting in the premature failure of the handover to the target cell. Therefore, the radio link monitoring on the source cell should be suspended when the handover execution is initiated upon the condition defined in the HO command is met.

In various embodiments according to this disclosure, when the UE (100) is configured with the conditional handover (CHO), the radio link monitoring on the source cell is continued when the handover command is received from the network. In another embodiment, when the UE (100) is configured with the conditional handover (CHO), the radio link monitoring on the source cell is suspended when the UE (100) initiates the handover execution to the target cell when the condition configured in the handover command is met. In various embodiments according to this disclosure, the UE (100) supports one of the LTE RAT and the NR RAT.

FIG. 3B illustrates an example of signaling for a continuation of the RLM timer (180) on the source cell till the execution of the HO command based on the CHO configuration, according to certain embodiments of this disclosure.

Referring to the illustrative example of FIG. 3B in conjunction with FIG. 3A, the steps 302*b* to 312*b* in FIG. 3B may be substantially the same as steps 302*a* to 312*a* in FIG. 3A, and, thus repeated description is omitted. At step 314*b*, in contrast with some methods and systems, the UE (100) continues the T310 timer (180) on receiving the HO command and also at step 316*b* continues the RLM procedure on the source cell. Further, at step 318*b*, the UE (100) monitors for satisfying the condition provided in the HO command for performing the conditional handover. At step 320*b*, in response to determining that the condition for performing the conditional handover is satisfied, the UE (100) suspends the RLM (stop T310 if running) on the source cell when the HO execution procedure is initiated. Further, at step 322*b*, the HO execution procedure is completed and at step 324*b*, the UE (100) sends the Reconfiguration complete message to the target gNB (1000*b*).

In certain embodiments, when the UE (100) is configured with the enhanced make before break (eMBB) and the conditional handover (CHO) for the same target cell, then the MBB/eMBB configuration may be provided in addition to the CHO criteria in the HO command. In such HO type, since the HO execution criteria are included, the HO command is received earlier in time than the need to perform the HO execution. During this time, the serving cell condition is expected to be sufficient to serve the UE (100) and the neighbour cells may not be suitable to handle the UE (100) under current signal conditions. If the radio link monitoring for the source cell is suspended in such cases, then the UE (100) may get locked on to the serving cell without having a mechanism to recover from the link degradation and related issues when the UE (100) moves towards a cell edge or out of coverage of the serving cell. Therefore, if the make before break (MBB/eMBB) handover in combination with the CHO is indicated, the UE (100) needs to continue the RLM procedure on the serving cell when the HO command is received.

In various embodiments, the HO execution is initiated by the UE (100) only when the CHO condition is met where the UE (100) follows the MBB/eMBB configuration provided in the HO command. When the CHO condition is met, then the serving cell signal conditions starts degrading and the neighbour cell becomes better suited to serve the UE (100) further. In such cases, the probability of the radio link failure on the source cell is expected to be higher than the probability of the HO failure on the target cell as the target cell has satisfied the condition required for performing the HO.

In various embodiments according to this disclosure, the UE (100) is configured with a HO type that combines make before break handover configuration and the CHO condition, the UE (100) suspends the radio link monitoring on the source cell when the HO execution to the target cell is initiated in the event when the condition configured in the HO command is met.

In at least one embodiment, when the UE (100) is configured with a HO type that combines make before break configuration and the CHO condition, the radio link monitoring on the source cell is continued by the UE (100) upon reception of the HO command from the network.

In various embodiments, when the UE (100) is configured with a HO type that combines the enhanced make before break handover configuration and the CHO condition, the radio link monitoring on the source cell is continued by the UE (100) upon reception of the HO command from the network.

In some embodiment, when the UE (100) is configured with a HO type that combines the enhanced make before break configuration and the CHO condition, the radio link monitoring on the source cell is suspended by the UE (100) when the HO execution to the target cell is initiated in the event when the condition configured in the HO command is met. Thus the UE (100) behaviour according to various embodiments is illustrated in FIG. 3B.

Therefore, in certain embodiments according to this disclosure, whenever the condition for performing the CHO is provided, or whenever a condition is specified along with any HO command, the RLM monitoring on the source cell is continued even after the HO command is received from the network. The RLM on the source cell is suspended only once the HO execution to the target cell is initiated (when the condition in the HO command is satisfied for the UE (100)).

Figure 4:
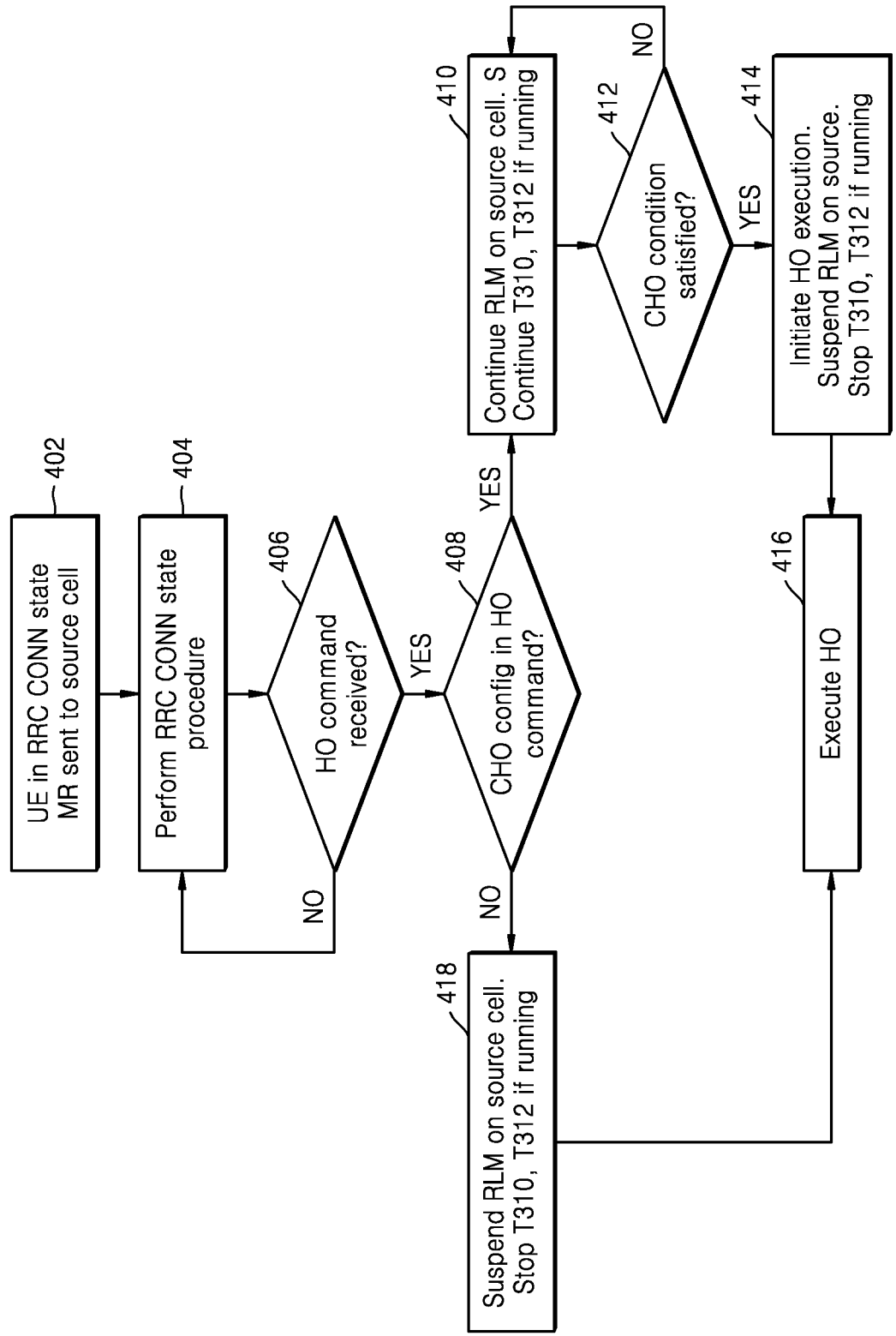
FIG. 4 illustrates an example of RLM monitoring during the HO execution, according to certain embodiments of this disclosure.

FIG. 4 illustrates aspects of an example of radio link monitoring during the HO execution, according to certain embodiments of this disclosure.

In various embodiments according to this disclosure, consider the RLM monitoring for a NR UE (100) which is controlled as described in FIG. 4. The UE (100) is the NR UE (100). At step 402, when the NR UE (100) is in the RRC CONN state, the MR is sent to the source cell and at step 404, the RRC CONN state procedure is performed. Further at step 406, the NR UE (100) determines whether the HO command is received from the network. In response to determining that the HO command is not received at the step 406, the NR UE (100) loops back to the step 404. In response to determining that the HO command is not received at the step 406, the NR UE (100) at step 408 determines whether the HO command comprises the CHO configuration.

Referring to the non-limiting example of FIG. 4, a response to determining that the HO command comprises the HO type indicated in the Rel 15 HO or Rel 16 MBB/eMBB HO, at step 418, the NR UE (100) stops the RLM timer (180) i.e., the T310 timer immediately on reception of the HO command and suspends the RLM on the source cell.

In response to determining that the HO command comprises the HO type indicated as one of: the conditional handover criteria, or a combination of the Rel 15 HO or the Rel 16 MBB/eMBB HO and the conditional handover criteria, then the NR UE (100) at step 410, continues the RLM timer (180) (if the T310 timer is already running) and continues the RLM procedures on the source cell.

Further at step 412, the NR UE (100) determines whether the conditional handover criteria is satisfied. In response to determining that the conditional handover criteria is not satisfied, the NR UE (100) loops to the step 410. In response to determining that the conditional handover criteria is satisfied, the NR UE (100) initiates the HO execution at step 414 and also suspends the RLM for the source cell (i.e., the T310 timer (180) is stopped, if the T310 timer (180) running). Further, at step 416, the NR UE (100) executes the handover and switches from the source cell to the candidate target cell.

In various embodiments according to this disclosure, the UE (100) is the LTE UE (100). At step 408, when the HO type indicated to the LTE UE (100) is Rel 16 eMBB HO or any pre-Rel16 HO, then at step 422, the UE (100) shall, stop the T310 immediately on reception of HO command (suspend RLM on source cell).

At step 408, when the HO type indicated to the LTE UE (100) is one of: conditional handover criteria and a combination of the Rel 16 eMBB or any of the pre-Rel 16 HO and the conditional handover criteria, then at step 410, the UE (100) shall continue the T310 timer (180) (if the T310 timer (180) is running) and the RLM procedures on the source cell. Further, when the HO execution begins in the event conditional handover criteria are met (at step 412), the UE (100) suspends the RLM for the source cell (T310 timer (180) stopped if the T310 timer (180) running) (as indicted in the step 414).

Figure 5A:
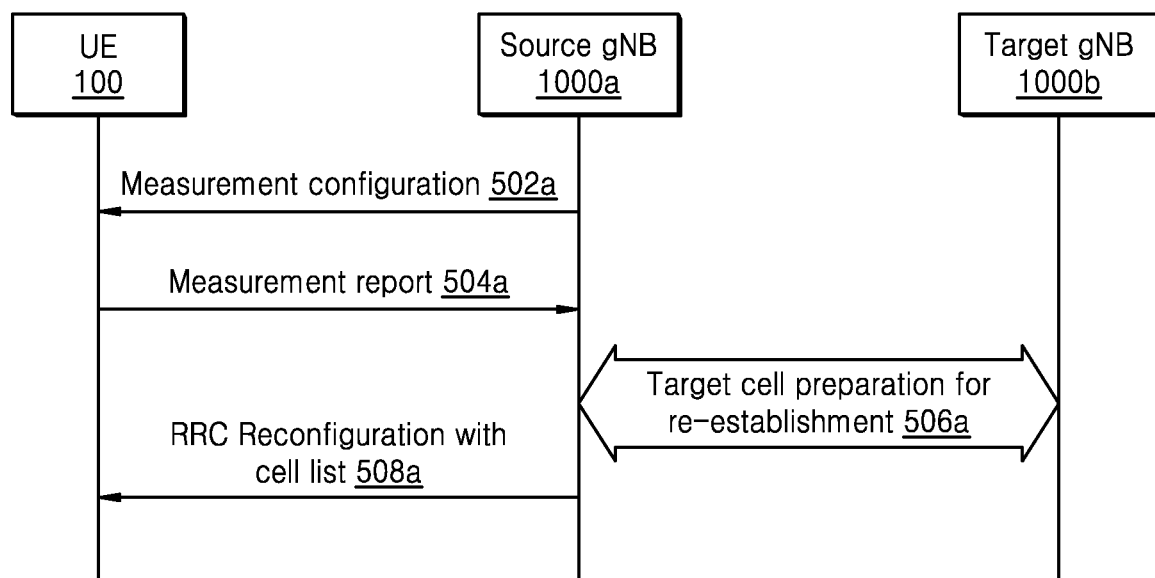
FIG. 5A illustrates an example of pro-active neighbor cell preparation for re-establishment, according to certain embodiments of this disclosure.

FIG. 5A illustrates an example of signaling for pro-active neighbour cell preparation for re-establishment to perform handover failure recovery, according to certain embodiments of this disclosure.

Figure 5B:
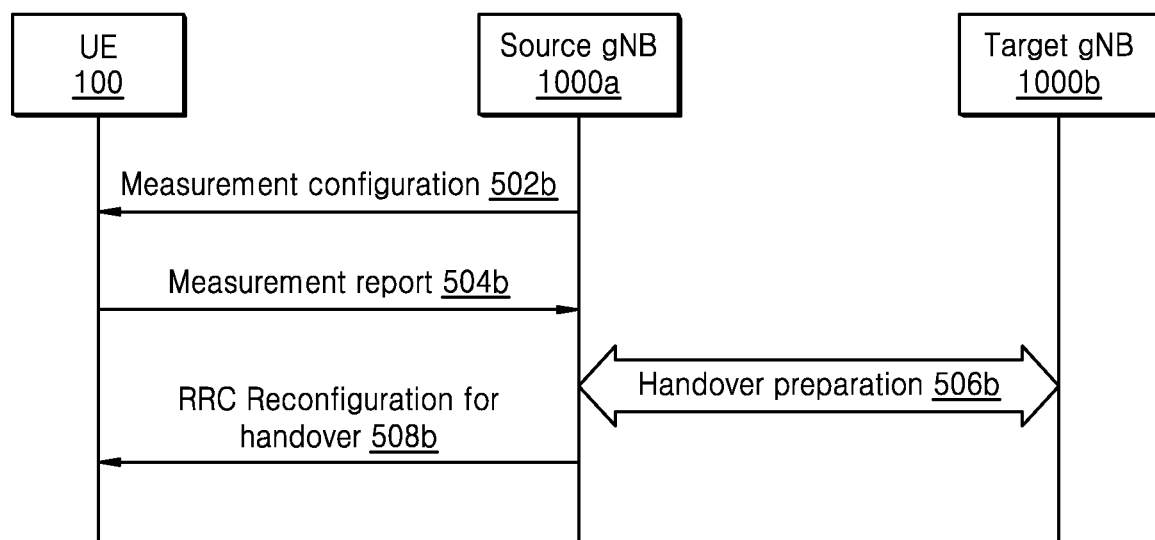
FIG. 5B illustrates an example of target cell preparation for the HO execution, according to certain embodiments of this disclosure.

FIG. 5B illustrates an example of signaling for target cell preparation for the HO execution, according to certain embodiments of this disclosure.

Consider a scenario where the UE (100) encounters the radio link failure (RLF). In response to the RLF, the UE (100) performs the cell selection procedure in order to select a suitable cell to re-establish the connection with the network. If the suitable cell is selected while the timer T311 is still running, then the UE (100) attempts to re-establish the RRC connection, otherwise the UE (100) transitions to an idle state. Further, the UE (100) decides the target cell for the re-establishment based on the cell search order and the cell signal quality.

The latency produced in the phase of handover failure recovery can be reduced by the network, by assisting the UE (100) with the preparation of the cell(s) on which the UE (100) can perform the re-establishment. However, the assistance information becomes useful only if the source cell (on which the RLF is being triggered) has already prepared the potential target cell (on which the UE (100) can perform the re-establishment) with the UE (100) context prior to the UE (100) encountering the RLF. Therefore, the UE (100) informs the network in advance via the measurement report about the presence of a certain neighbour cells which in turn allows the network to proactively prepare the neighbour cell to accommodate for the potential re-establishment from the UE (100). The preparation of the target cells for the re-establishment includes: at step 502a, the UE (100) receives the measurement configuration from the source gNB (1000a). At step 504a, the UE (100) sends the measurement report to the source gNB (1000a). Further, the source gNB (1000a) communicates with the target gNB (1000b) and prepares the target cell for performing the re-establishment. Further, the target gNB (1000b) sends the RRC Reconfiguration with the list of target cells which can be used for re-establishment.

The sequence of procedures and the signaling involved in order to support early preparation of the target cells for the re-establishment is similar to that of the handover signaling (as described in steps 502b-508b except for the step 506b where the source gNB (1000a) prepares the target cell for performing the handover). In some embodiments, the network need not assist the UE (100) with the list of prepared cells. Instead, the network may rather choose to perform the handover.

Figure 6:
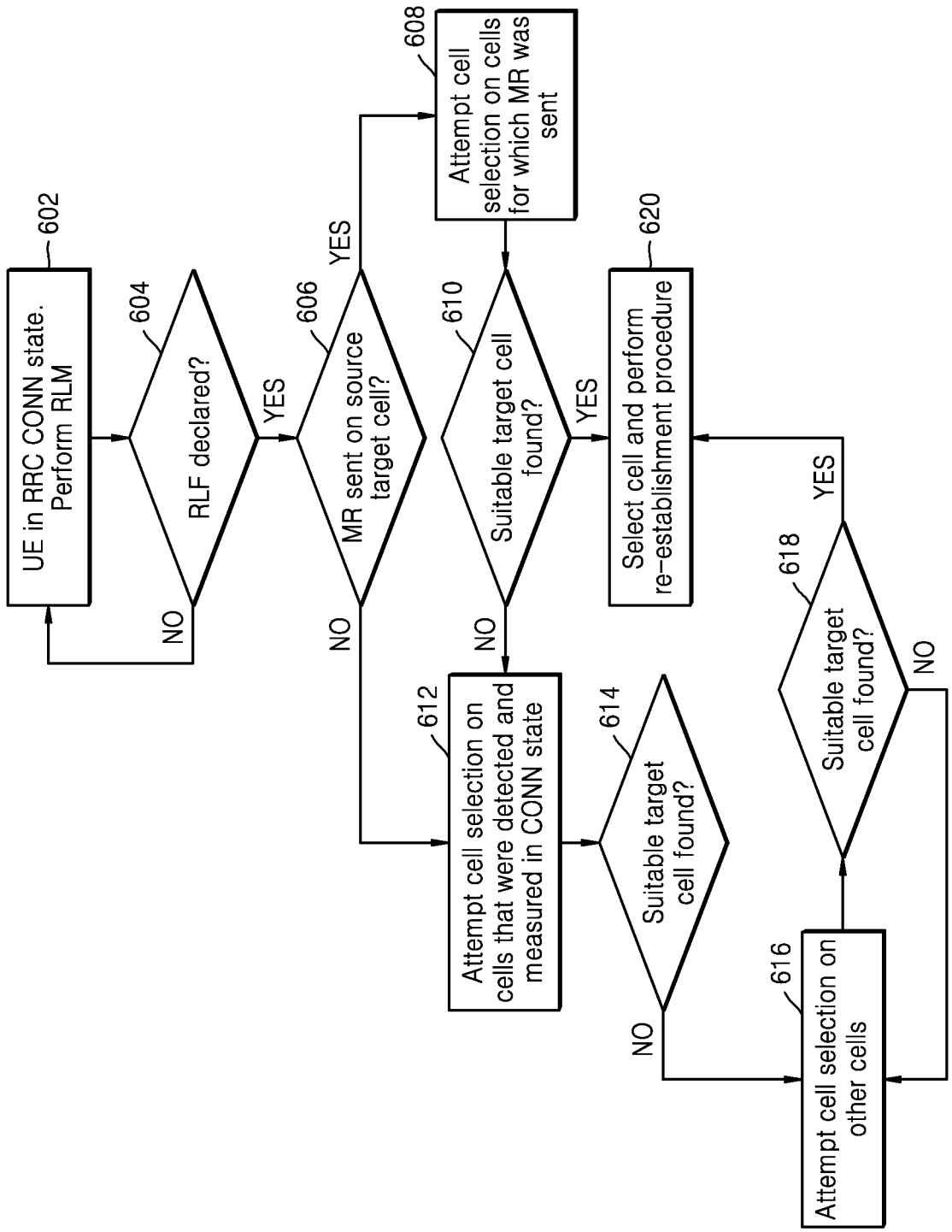
FIG. 6 illustrates an example of cell selection prioritization (order) when attempting re-establishment, according to certain embodiments of this disclosure.

FIG. 6 illustrates, through flow chart 600, an example of cell selection prioritization (order) when the UE (100) attempts the re-establishment of the connection with the wireless communication network, according to certain embodiments of this disclosure.

In some embodiments, the target cell is selected for handover failure recovery, for example, by prioritizing the cells for which the measurement report is sent to the source cell. On receiving the measurement report from the UE (100), the source cell may have prepared the target cells with the UE context. The UE (100) leverages that the source cell has prepared the target cells with the UE context and attempts for the failure recovery on the target cells. Further, when the UE (100) selects a suitable cell for performing the re-establishment of the RRC connection, if the T311 is still running on the UE (100), then the UE (100) initiates the random access procedure and the T301 is stared. The T301 is used in order to monitor and control the success/failure of the random access procedure and hence cannot be optimized.

Simultaneously, the target cell tries to fetch the UE context from the source cell after the successful reception of the re-establishment request from the UE (100). The reduction in the UE context retrieval time is possible if the UE (100) attempts the re-establishment on the cells for which the measurement report is sent to the source cell. On receiving the measurement report from the UE (100), the source cell may have successfully prepared the target cell prior to the UE (100) encountering the radio link failure. The scenario can be handled if the UE (100) follows the prioritized cell selection procedure.

In the prioritized cell selection procedure, during the handover failure or the radio link failure recovery procedure, a higher priority is provided for the cell for which a measurement report is sent to the source cell prior to the RLF. Therefore, the UE (100) attempts to re-establish the connection to the cells which may already be prepared for the UE (100) based on the measurement report which is previously sent to the source cell. Further, the next higher priority is given to the cells that were detected when on the source cell but for which the measurement report is not triggered. The re-establishment is attempted for the next higher priority cells as there is a high probability that the UE (100) is still in vicinity of the detected cells while attempting to perform the re-establishment. Further, the next priority is provided to all the remaining other cell.

FIG. 6 illustrates an example of a sequence of procedures involved in selecting target cell for handover failure or radio link failure recovery. Referring to the non-limiting example of FIG. 6, at step 602, the UE (100) which is in the RRC CONN state, perform the RLM procedure. At step 604, the UE (100) determines whether the RLF is declared. In response to determining that the RLF is not declared, the UE (100) continues the RLM procedure. In response to determining that the RLF is declared, at step 606, the UE (100) determines whether the measurement report is sent on the source cell.

On determining that the measurement report is sent on the source cell, at step 608, the UE (100) attempts the target cell selection on the target cells for which the MR was sent. Further, at step 610, the UE (100) determines whether a suitable target cell (candidate target cell) is found to which the UE (100) can perform the re-establishment. In response to determining that the suitable target cell is found, at step 620, the UE (100) selects the target cell and performs the re-establishment procedure.

In response to determining that the suitable target cell is not found, at step 612, the UE (100) attempts the target cell selection on the target cells that were detected and measured in the RRC CONN state. Further, at step 614a, the UE (100)

determines again whether the suitable target cell is found to which the UE (100) can perform the re-establishment. In response to determining that the suitable target cell is not found, at step 616, the UE (100) attempts target cell selection on other target cells and then again checks whether the suitable target cell is found at step 618. At step 614 and step 618, in response to determining that the suitable target cell is found, the UE (100) selects the target cell and performs the re-establishment procedure (step 620).

Figure 7A:
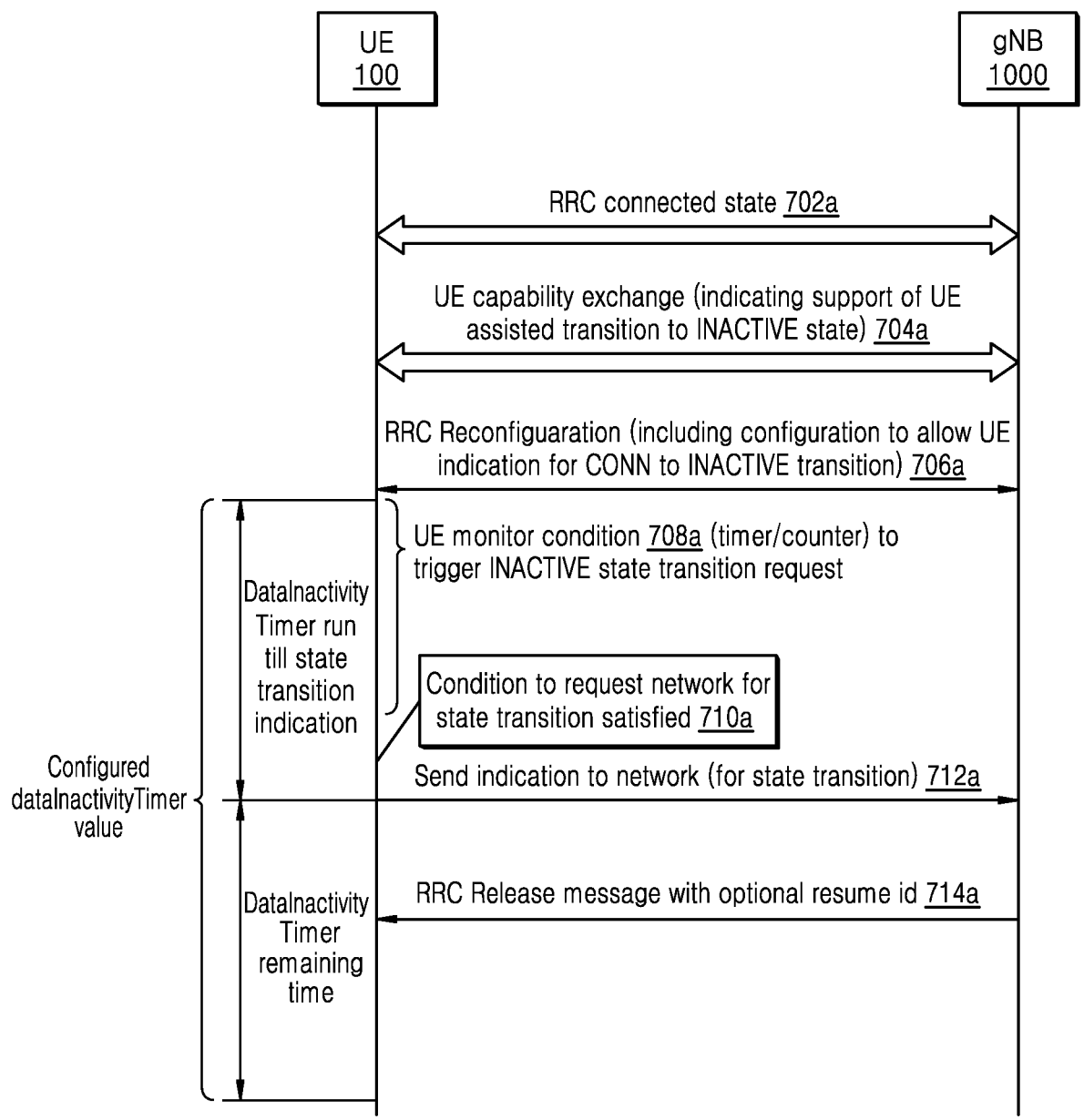
FIG. 7A illustrates aspects of an example of a method of performing a UE controlled RRC_CONNECTED to RRC_INACTIVE state transition as on a configured threshold, according to certain embodiments of this disclosure.

FIG. 7A illustrates an example of signaling for performing the UE controlled state transition from RRC_CONNECTED state to RRC_INACTIVE state as on a configured threshold, according to certain embodiments of this disclosure.

Figure 7B:
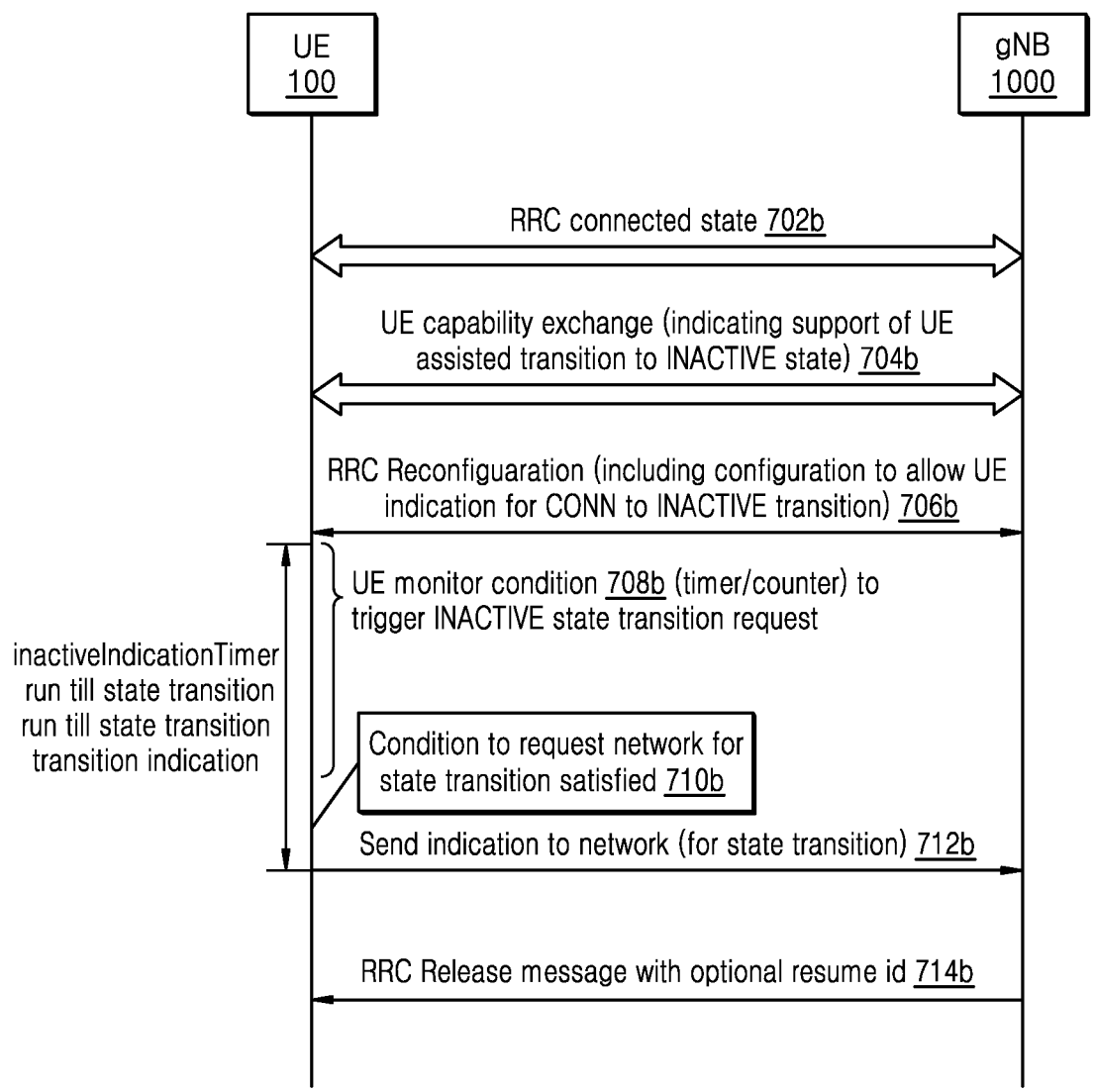
FIG. 7B illustrates aspects of an example of a method of performing the UE controlled RRC_CONNECTED to RRC_INACTIVE state transition as on a configured timer, according to certain embodiments of this disclosure.

FIG. 7B illustrates an example of signaling for performing the UE controlled state transition from the RRC_CONNECTED state to the RRC_INACTIVE state transition as on a configured timer, according to certain embodiments of this disclosure.

Figure 7C:
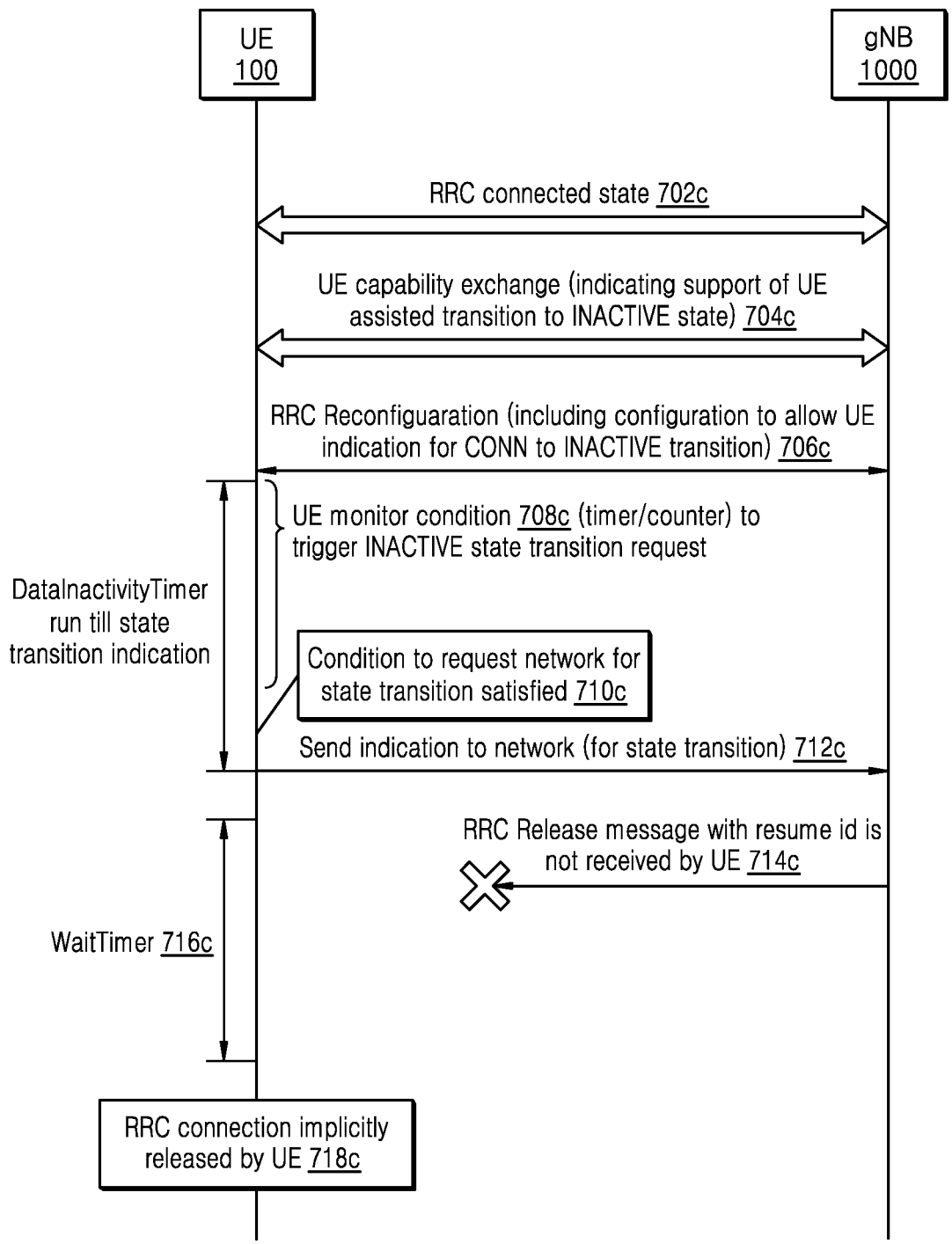
FIG. 7C illustrates aspects of an example of a method of performing the UE autonomous RRC_CONNECTED to RRC_IDLE state transition as on a configured timer, according to certain embodiments of this disclosure.

FIG. 7C illustrates an example of signaling for performing the UE autonomous state transition from the RRC_CONNECTED state to an RRC_IDLE state as on a configured timer, according to certain embodiments of this disclosure.

In general, 3GPP is studying methods to reduce power consumption in the UE (100) and make the UE (100) more power efficient. In general, the UE (100) consumes maximum power when the UE (100) is in the RRC CONN State and the UE (100) consumes least power when the UE (100) is in one of: the RRC_IDLE state and the RRC_INACTIVE state. Therefore, in order to improve power efficiency the UE (100) can be moved to one of: the RRC IDLE state and the RRC INACTIVE state from the RRC CONN State when there is no data transfer expected.

Referring to the non-limiting example of FIG. 7A, at step 702a, the UE (100) is in the RRC connected state and at 704a, the UE (100) shares the UE capability exchange indicating support of the UE assisted transition to INACTIVE state. At step 706a, the RRC Reconfiguaration comprising the configuration to allow the UE (100) to send the indication for the transition from the RRC CONN state to the RRC INACTIVE state. Further, at step 708a, the UE (100) monitors the condition of one of: the timer and the counter to trigger the RRC INACTIVE state transition request. The timer may be for example the DataInactivityTimer. Further, at step 710a, the UE (100) determines that the condition to request the network for the state transition satisfied and at step 712a, the UE (100) sends the indication to the wireless communication network for the state transition. Further, the in response to the indication for the state transition, the gNB (1000) of the wireless communication network sends the RRC Release message with optional resume id.

In various embodiments according to this disclosure, the UE (100) in the RRC connected state is allowed to send the indication for the state transition, if the UE (100) is configured with the dataInactivityTimer.

In various embodiments according to this disclosure, if the dataInactivityTimer is running, the UE (100) in the RRC Connected state monitors a condition such as for example an inactiveIndicationThreshold condition (step 708a) to trigger the state transition indication. On determining that the inactiveIndicationThreshold condition is met (step 710a), the UE (100) triggers the state transition indication to the network (step 712a) as illustrated in the example of FIG. 7A. Further, the inactiveIndicationThreshold condition is specified as a percentage or the dataInactivityTimer or in terms of C-DRX cycles while the dataInactivityTimer is running.

In various embodiments according to this disclosure, the state transition indication is a request to the network to send the UE (100) from the RRC Connected state to the RRC INACTIVE state.

In various embodiments according to this disclosure, after triggering the state transition indication, upon expiry of the datainactivityTimer the UE (100) moves to the RRC IDLE state.

In another embodiment, the UE (100) is allowed to send the indication for the state transition if the UE (100) is explicitly configured with the inactiveIndicationTimer.

In various embodiments according to this disclosure, a condition to start/re-start the inactiveIndicationTimer is the same as the datainactivityTimer regardless of whether the datainactivityTimer is configured. Therefore, referring to the FIG. 7B, the UE (100) in the RRC Connected state (702b) triggers the state transition indication to the network (712b), when the inactiveIndicationTimer expires (710b), as illustrated in FIG. 7B.

Referring to the non-limiting example of FIG. 7C, steps 702c to 712c are substantially the same as in the previously described figures and hence repeated description is omitted. At step 714c, the RRC Release message with resume id is not received by the UE (100). In various embodiments according to this disclosure, after triggering the state transition indication, the UE (100) starts the waitTimer and upon expiry of the waitTimer (step 716c), the UE (100) moves to the RRC IDLE state as illustrated in FIG. 7C. In another embodiment, after triggering the state transition indication, the UE (100) starts the waitTimer and upon expiry of the waitTimer (step 716c), the UE (100) leaves the RRC connected state.

In another embodiment, the UE (100) is allowed to send the indication for the state transition, if the UE (100) is explicitly configured with inactiveIndicationTimer in addition the UE (100) is configured with dataInactivityTimer.

In various embodiments according to this disclosure, the condition to start/re-start the inactiveIndicationTimer is the same as datainactivityTimer.

In various embodiments according to this disclosure, if the datainactivityTimer is running the UE (100) in the RRC Connected state triggers the state transition indication to the network, when the inactiveIndicationTimer expires.

In various embodiments according to this disclosure, after triggering the state transition indication, the starts the waitTimer and upon expiry of either the waitTimer or dataInactivityTimer whichever is earlier the UE (100) moves to the RRC IDLE state.

In certain embodiments according to this disclosure, the proposed method allows the UE (100) to inform the network about the UE capability to request or assist the serving gNB for the RRC CONN to the RRC INACTIVE state transition. On receiving the UE capability, the network may choose to one of: allow the UE (100) to request state transition when required and not allow the UE (100) to request state transition when required. If the serving gNB choses to allow the UE (100) to request for the state transition, then the UE (100) monitors the conditions and criteria which can eventually trigger the request to network.

In an RRC message (for example: RRCReconfiuration message), the network provides the UE (100) with the necessary configuration required to request for the state transition. Therefore, the RRC message with the configuration required to request for the state transition allows the UE (100) to monitor the required conditions and trigger indication to the network for the state transition from the RRC CONN to the RRC INACTIVE needed. The network may provide the configuration for one of: triggering indication to network, requesting state transition/connection release, as a timer based configuration or a counter based configuration. In current release 15 specifications, a dataInactivityTimer is used to allow the UE (100) for implicit transition to the RRC idle state.

The details of timer handling in certain embodiments of this disclosure are as provided

```
start or restart dataInactivityTimer:
        if any MAC entity receives a MAC SDU for DTCH/ DCCH/
        CCCH logical channel.
        if any MAC entity transmits a MAC SDU for DTCH/ DCCH
        logical channel
dataInactivityTimer Expiry:
        indicate the expiry of the dataInactivityTimer to RRC
RRC handling on receiving indication of dataInactivityTimer expiry:
        perform the actions upon going to RRC_IDLE, with release
        cause 'RRC connection failure'
MAC-CellGroupConfig ::=        SEQUENCE {
    drx-Config                 SetupRelease { DRX-Config }
OPTIONAL, -- Need M
    schedulingRequestConfig    SchedulingRequestConfig
OPTIONAL, -- Need M
    bsr-Config                 BSR-Config
OPTIONAL, -- Need M
    tag-Config                 TAG-Config
OPTIONAL, -- Need M
    phr-Config                 SetupRelease { PHR-Config }
OPTIONAL, -- Need M
    skipUplinkTxDynamic        BOOLEAN,
    ...,
    [[
    csi-Mask-v1530             BOOLEAN
OPTIONAL, -- Need M
    dataInactivityTimer-v1530  SetupRelease { DataInactivityTimer }
OPTIONAL -- Cond MCG-Only
    ]]
}
DataInactivityTimer ::=    ENUMERATED {s1, s2, s3, s5, s7, s10, s15,
s20, s40, s50, s60, s80, s100, s120, s150, s180}
```

The proposed timer based configuration: The configuration is provided conditional to the present of dataInactivityTimer.

```
    MAC-CellGroupConfig ::=       SEQUENCE
    drx-Config                    SetupRelease { DRX-Config }
OPTIONAL, -- Need M
    schedulingRequestConfig       SchedulingRequestConfig
OPTIONAL, -- Need M
    bsr-Config                    BSR-Config
OPTIONAL, -- Need M
    tag-Config                    TAG-Config
OPTIONAL, -- Need M
    phr-Config                    SetupRelease { PHR-Config }
OPTIONAL, -- Need M
    skipUplinkTxDynamic           BOOLEAN,
    ...,
    [[
    csi-Mask-v1530                BOOLEAN
OPTIONAL, -- Need M
    dataInactivityTimer-v1530  SetupRelease { DataInactivityTimer }
OPTIONAL -- Cond MCG-Only
    ]]
    [[
    inactiveIndicationTimer-r16   SetupRelease
{ InactiveIndicationTimer }   OPTIONAL   -- Cond DataInactTimer
    ]]
}
DataInactivityTimer ::=   ENUMERATED {s1, s2, s3, s5, s7, s10, s15,
s20, s40, s50, s60, s80, s100, s120, s150, s180}
InactiveIndicationTimer-r16     ENUMERATED {0dot2, 0dot4, 0dot6,
0dot8}
```

Examples of the MAC-CellGroupConfig field descriptions are provided in Table 1 and the conditional presence is described in Table 2.

TABLE 1

MAC-CellGroupConfig field descriptions csi-Mask-v1530
If set to true, the UE limits CSI reports to the on-duration period of the DRX cycle, see TS 38.321 [3].
dataInactivityTimer-v1530
Releases the RRC connection upon data inactivity as specified in clause 5.3.8.5 and in TS 38.321 [3]. Value s1 corresponds to 1 second, s2 corresponds to 2 seconds and so on.
drx-Config
Used to configure DRX as specified in TS 38.321 [3].
inactiveIndicationTimer-r16
Triggers UL transmission to indicate the network about need to transition to INACTIVE state due to data inactivity. Value 0dot2 refers to 20% of dataInactivityTimer and so on.
skipUplinkTxDynamic
If set to true, the UE skips UL transmissions for an uplink grant other than a configured uplink grant if no data is available for transmission in the UE buffer as described in TS 38.321 [3]. FFS: configurable per SCell?

TABLE 2

| Conditional Presence | Explanation |
| --- | --- |
| MCG-Only | This field is optionally present, Need M, for the MAC-CellGroupConfig of the MCG. It is absent otherwise. |
| DataInactTimer | The field is optionally present, Need M, for MAC entity when dataInactivityTimer is configured. It is absent otherwise. |

Handling of inactiveIndicationTimer: In certain embodiments, the MAC handles this timer based on data activity on the MAC entity and indicates to RRC once the configured threshold timer condition is satisfied.

5.19 Data Inactivity Monitoring (38.321)

The UE may be configured by RRC with a Data inactivity monitoring functionality, when in RRC_CONNECTED. RRC controls Data inactivity operation by configuring the timer dataInactivityTimer.

When dataInactivityTimer is configured, the UE shall:

1> if inactiveIndicationTimer is not configured;
    2> if any MAC entity receives a MAC SDU for DTCH logical channel, DCCH logical channel, or CCCH logical channel; or
    2> if any MAC entity transmits a MAC SDU for DTCH logical channel, or DCCH logical channel:
        3> start or restart dataInactivityTimer.
    2> if the dataInactivityTimer expires:
        3> indicate the expiry of the dataInactivityTimer to upper layers.
1> else, if inactiveIndicationTimer is configured;
    2> if any MAC entity receives a MAC SDU for DTCH logical channel, DCCH logical channel, or CCCH logical channel; or
    2> if any MAC entity transmits a MAC SDU for DTCH logical channel, or DCCH logical channel:
        3> start or restart inactiveIndicationTimer.
    2> if the inactiveIndicationTimer expires:
        3> indicate the expiry of the inactiveIndicationTimer to upper layers.

5.3.8.6. UE Actions Upon the Expiry of InactiveIndicationTimer (38.331)

Upon receiving the expiry of inactiveIndicationTimer from lower layers while in RRC_CONNECTED, the UE shall:

1> initiate transmission of UEAssistanceMessage with inactiveIndication set.

Alternatively, the network may configure the UE with inactiveIndicationTimer independent of dataInactivityTimer. In such cases, the handling is as illustrated below:

Configuration:

```
MAC-CellGroupConfig ::=       SEQUENCE {
    drx-Config                SetupRelease { DRX-Config }
OPTIONAL, -- Need M
    schedulingRequestConfig   SchedulingRequestConfig
OPTIONAL, -- Need M
    bsr-Config                BSR-Config
OPTIONAL, -- Need M
    tag-Config                TAG-Config
OPTIONAL, -- Need M
    phr-Config                SetupRelease { PHR-Config }
OPTIONAL, -- Need M
    skipUplinkTxDynamic       BOOLEAN,
    ...,
    [[
    csi-Mask-v1530            BOOLEAN
OPTIONAL, -- Need M
    dataInactivityTimer-v1530 SetupRelease { DataInactivityTimer }
OPTIONAL -- Cond MCG-Only
    ]]
    [[
    inactiveIndicationTimer-r16       SetupRelease
{InactiveIndicationTimer }    OPTIONAL    -- Need M
    ]]
}
DataInactivityTimer ::=   ENUMERATED {s1, s2, s3, s5, s7, s10, s15,
s20, s40, s50, s60, s80, s100, s120, s150, s180}
InactiveIndicationTimer-r16       ENUMERATED {ms200, ms500,
ms1000, ms2000, ms5000, ms10000}
```

Further, examples of the MAC-CellGroupConfig field descriptions according to certain embodiments, are provided in Table 3.

TABLE 3

MAC-CellGroupConfig field descriptions csi-Mask-v1530
If set to true, the UE limits CSI reports to the on-duration period of the DRX cycle, see TS 38.321 [3].
dataInactivityTimer-v1530
Releases the RRC connection upon data inactivity as specified in clause 5.3.8.5 and in TS 38.321 [3]. Value s1 corresponds to 1 second, s2 corresponds to 2 seconds and so on.
drx-Config
Used to configure DRX as specified in TS 38.321 [3].
inactiveIndicationTimer-r16
Triggers UL transmission to indicate the network about need to transition to INACTIVE state due to data inactivity. Value ms200 refers to 200ms and so on.
skipUplinkTxDynamic
If set to true, the UE skips UL transmissions for an uplink grant other than a configured uplink grant if no data is available for transmission in the UE buffer as described in TS 38.321 [3]. FFS : configurable per SCell?

Handling of inactiveIndicationTimer: The MAC handles this timer based on data activity on the MAC entity and indicates to RRC once the configured threshold timer condition is satisfied.

5.19 Data Inactivity Monitoring (38.321)

The UE may be configured by RRC with a Data inactivity monitoring functionality, when in RRC_CONNECTED. RRC controls Data inactivity operation by configuring the timer dataInactivityTimer.

When dataInactivityTimer is configured, the UE shall:

1> if any MAC entity receives a MAC SDU for DTCH logical channel, DCCH logical channel, or CCCH logical channel; or
1> if any MAC entity transmits a MAC SDU for DTCH logical channel, or DCCH logical channel:
  2> start or restart dataInactivityTimer.
1> if the dataInactivityTimer expires:
  2> indicate the expiry of the dataInactivityTimer to upper layers.

5.X Inactivity Indication Monitoring (38.321)

When dataInactivityTimer is configured, the UE shall:

1> if any MAC entity receives a MAC SDU for DTCH logical channel, DCCH logical channel, or CCCH logical channel; or
1> if any MAC entity transmits a MAC SDU for DTCH logical channel, or DCCH logical channel:
  2> start or restart inactiveIndicationTimer.
1> if the inactiveIndicationTimer expires:
  2> indicate the expiry of the inactiveIndicationTimer to upper layers.

5.3.8.6 UE Actions Upon the Expiry of InactiveIndicationTimer (38.331)

Upon receiving the expiry of inactiveIndicationTimer from lower layers while in RRC_CONNECTED, the UE shall:

1> initiate transmission of UEAssistanceMessage with inactiveIndication set.

The proposed counter based configuration: The need for transition to INACTIVE state can be monitored based on a count of DRX cycles without data inactivity. If the configured number of DRX cycles have elapsed without any transmission or reception (drxInactivityTimer is not started even once during this duration), the UE (100) initiates transmission of stat transition indication to network.

```
DRX-Config ::=            SEQUENCE {
    drx-onDurationTimer       CHOICE {
                subMilliSeconds INTEGER (1..31),
                milliSeconds ENUMERATED {
                    ms1, ms2, ms3, ms4, ms5, ms6, ms8, ms10,
ms20, ms30, ms40, ms50, ms60,
                    ms80, ms100, ms200, ms300, ms400, ms500,
ms600, ms800, ms1000, ms1200,
                    ms1600, spare8, spare7, spare6, spare5,
spare4, spare3, spare2, spare1 }
                }
    drx-InactivityTimer       ENUMERATED {
                ms0, ms1, ms2, ms3, ms4, ms5, ms6, ms8,
ms10, ms20, ms30, ms40, ms50, ms60, ms80,
                ms100, ms200, ms300, ms500, ms750, ms1280,
ms1920, ms2560, spare9, spare8,
                spare7, spare6, spare5, spare4, spare3, spare2,
spare1 },
    drx-HARQ-RTT-TimerDL      INTEGER (0..56),
    drx-HARQ-RTT-TimerUL      INTEGER (0..56),
    drx-RetransmissionTimerDL ENUMERATED {
                sl0, sl1, sl2, sl4, sl6, sl8, sl16, sl24, sl33, sl40,
sl64, sl80, sl96, sl112, sl128,
                sl160, sl320, spare15, spare14, spare13,
spare12,
spare11, spare10, spare9,
                spare8, spare7, spare6, spare5, spare4, spare3,
spare2, spare1 },
    drx-RetransmissionTimerUL
ENUMERATED {
```

```
                    sl0, sl1, sl2, sl4, sl6, sl8, sl16, sl24, sl33, sl40,
sl64, sl80, sl96, sl112, sl128,
                    sl160, sl320, spare15, spare14, spare13,
spare12,
spare11, spare10, spare9,
                    spare8, spare7, spare6, spare5, spare4, spare3,
spare2, spare1 },
    drx-LongCycleStartOffset    CHOICE {
        ms10                    INTEGER(0..9),
        ms20                    INTEGER(0..19),
        ms32                    INTEGER(0..31),
        ms40                    INTEGER(0..39),
        ms60                    INTEGER(0..59),
```

```
    drx-ShortCycleTimer         INTEGER (1..16)
    }
OPTIONAL, -- Need R
    drx-SlotOffset              INTEGER (0..31)
    [[
        inactiveIndciationCounter-r16    SetupRelease
{ InactiveIndciationCounter }
    ]]
}
InactiveIndicationCounter   ENUMERATED {n2, n5, n10, n25, n100}
```

Further, an example of DRX-Config field descriptions according to certain embodiments is provided in table 4, below.

TABLE 4

DRX-Config field descriptions drx-HARQ-RTT-TimerDL
Value in number of symbols of the BWP where the transport block was received.
drx-HARQ-RTT-TimerUL
Value in number of symbols of the BWP where the transport block was transmitted.
drx-InactivityTimer
Value in multiple integers of 1ms. ms0 corresponds to 0, ms1 corresponds to 1ms, ms2
corresponds to 2ms, and so on.
drx-LongCycleStartOffset
drx-LongCycle in ms and drx-StartOffset in multiples of 1ms. If drx-ShortCycle is
configured, the value of drx-LongCycle shall be a multiple of the drx-ShortCycle value.
drx-onDurationTimer
Value in multiples of 1/32 ms (subMilliSeconds) or in ms (milliSecond). For the latter,
ms1 corresponds to 1ms, ms2 corresponds to 2ms, and so on.
drx-RetransmissionTimerDL
Value in number of slot lengths of the BWP where the transport block was received. sl0
corresponds to 0 slots, sl1 corresponds to 1 slot, sl2 corresponds to 2 slots, and so on.
drx-RetransmissionTimerUL
Value in number of slot lengths of the BWP where the transport block was transmitted.
sl0 corresponds to 0 slots, sl1 corresponds to 1 slot, sl2 corresponds to 2 slots, and so on.
drx-ShortCycleTimer
Value in multiples of drx-ShortCycle. A value of 1 corresponds to drx-ShortCycle, a
value of 2 corresponds to 2 * drx-ShortCycle and so on.
drx-ShortCycle
Value in ms. ms1 corresponds to 1ms, ms2 corresponds to 2ms, and so on.
drx-SlotOffset
Value in 1/32 ms. Value 0 corresponds to 0ms, value 1 corresponds to 1/32ms, value 2
corresponds to 2/32ms, and so on.
inactiveIndciationCounter
Triggers UL transmission to indicate the network about need to transition to INACTIVE
state due to data inactivity. Value n2 refers to 2 drx cycles and so on.

```
                -continued ms64                INTEGER(0..63),
        ms70                INTEGER(0..69),
        ms80                INTEGER(0..79),
        ms128               INTEGER(0..127),
        ms160               INTEGER(0..159),
        ms256               INTEGER(0..255),
        ms320               INTEGER(0..319),
        ms512               INTEGER(0..511),
        ms640               INTEGER(0..639),
        ms1024              INTEGER(0..1023),
        ms1280              INTEGER(0..1279),
        ms2048              INTEGER(0..2047),
        ms2560              INTEGER(0..2559),
        ms5120              INTEGER(0..5119),
        ms10240             INTEGER(0..10239)
    }
    shortDRX                SEQUENCE {
        drx-ShortCycle      ENUMERATED {
                    ms2, ms3, ms4, ms5, ms6, ms7, ms8,
ms10, ms14, ms16, ms20, ms30, ms32,
                    ms35, ms40, ms64, ms80, ms128, ms160,
ms256, ms320, ms512, ms640, spare9,
                    spare8, spare7, spare6, spare5, spare4,
spare3, spare2, spare1 },
```

5.3.8.x UE Actions Upon Satisfying InactiveIndication-Counter (38.331)

Upon satisfying the condition of not having and DL reception or UL transmission for inactiveIndciationCounter count of DRX, from lower layers while in RRC_CONNECTED, the UE shall:

1> initiate transmission of UEAssistanceMessage with inactiveIndication set.

Table 5 illustrates an example throughput measurements for NR calculated at the Radio link control (RLC) layer based on data volume between reference time points at the RLC layer, in certain embodiments according to this disclosure. A method to perform Layer 2 throughput measurements by gNB/NG-eNB according to certain embodiments of this disclosure, is described below. Performance measurements for 5G networks including throughput measurements at gNB are defined in the SA5 TS 28.552 "5G performance measurements". RAN2 also studied the feasibility of SA5 defined measurements related to RAN2. Generally, the throughput measurements are calculated at PDCP SDU level based on data volume between reference time points at PDCP layer in LTE. However, the throutout measurements for NR are calculated at RLC layer based on data volume between reference time points at RLC layer as illustrated in table 5.

TABLE 5

| LTE: Scheduled IP Throughput in DL (Similar measurement defined for as well) The measurement is performed per QCI per UE. | NR: Average DL UE throughput in gNB (Similar measurement defined for as well) The measurement is optionally split into subcounters per QoS level |
|---|---|
| If $\sum ThpTimeDl > 0$, $\dfrac{\sum ThpVolDl}{\sum ThpTimeDl} \times 1000 \; [kbits/s]$ | If $\sum_{UEs}\sum ThpTimeDl > 0$, $\dfrac{\sum_{UEs}\sum ThpVolDl}{\sum_{UEs}\sum ThpTimeDl} \times 1000 \; [kbits/s]$ |
| If $\Sigma \; ThpTimeDl = 0$, $0 \; [kbits/s]$ | If $\sum_{UEs}\sum ThpTimeDl = 0$, $0 \; [kbits/s]$ |
| For small data bursts, where all buffered data is included in one initial HARQ transmission, ThpTimeDl = 0, otherwise ThpTimeDl = T1 − T2 [ms] | For small data bursts, where all buffered data is included in one initial HARQ transmission, ThpTimeDl = 0, otherwise ThpTimeDl = T1 − T2 [ms] |
| ThpTimeDl | The time to transmit a data burst excluding the last piece of data transmitted in the TTI when the buffer is emptied. A sample of "ThpTimeDl" for each time the DL buffer for one E-RAB is emptied. | ThpTimeDl | The time to transmit a data burst excluding the data transmitted in the slot when the buffer is emptied. A sample of "ThpTimeDl" for each time the DL buffer for one DataRadioBearer (DRB) is emptied. |
| T1 | The point in time after T2 when data up until the second last piece of data in the transmitted data burst which emptied the PDCP SDU available for transmission for the particular E-RAB was successfully transmitted, as acknowledged by the UE. | T1 | The point in time after T2 when data up until the second last piece of data in the transmitted data burst which emptied the RLC SDU available for transmission for the particular DRB was successfully transmitted, as acknowledged by the UE. |
| T2 | The point in time when the first transmission begins after a PDCP SDU becomes available for transmission, where previously no PDCP SDUs were available for transmission for the particular E-RAB. | T2 | The point in time when the first transmission begins after a RLC SDU becomes available for transmission, where previously no RLC SDUs were available for transmission for the particular DRB. |
| ThpVolDl | The volume of a data burst, excluding the data transmitted in the TTI when the buffer is emptied. A sample for ThpVolDl is the data volume, counted on PDCP SDU level, in kbits successfully transmitted (acknowledged by UE) in DL for one E-RAB during a sample of ThpTimeDl. It shall exclude the volume of the last piece of data emptying the buffer. | ThpVolDl | The RLC level volume of a data burst, excluding the data transmitted in the slot when the buffer is emptied. A sample for ThpVolDl is the data volume, counted on RLC SDU level, in kbits successfully transmitted (acknowledged by UE) in DL for one DRB during a sample of ThpTimeDl. (It shall exclude the volume of the last piece of data emptying the buffer). |

Further, the throughput measurements defined for NR by SA5 are performed at RLC layer whereas in LTE, it is measured at PDCP layer.

A QoS flow is the smallest granularity over which QoS verification can be performed by the network. The mapping between QoS flow and DRB in NR is not always one to one and can also be many to one. Therefore, performing throughput measurement at RLC layer alone is not sufficient to verify QoS and identify the throughput per QoS flow. An analysis of adequacy of RLC level throughput measurements for different possible bearer configuration on NR is illustrated in Table 6, below:

TABLE 6

| No | Bearer Type | Bearer termination point (RAN node with PDCP) | Connected CN | RLC layer measurement Sufficient? | Remarks |
|---|---|---|---|---|---|
| 1 | Direct bearer on NR | gNB | 5GC | NO | RB may have multiple QoS flows |

TABLE 6-continued

| No | Bearer Type | Bearer termination point (RAN node with PDCP) | Connected CN | RLC layer measurement Sufficient? | Remarks |
|---|---|---|---|---|---|
| 2 | | gNB | EPC | YES | mapped to it. PDCP Throughput = RLC Throughput |
| 3 | Split bearer on NR | gNB | 5GC | NO | RB may have multiple QoS flows mapped to it. |
| 4 | | eNB | 5GC | NO | |
| 5 | | gNB | EPC | YES | PDCP Throughput = Sum of both RLC entity throughputs |
| 6 | | eNB | EPC | YES | |

According to certain embodiments, all the bearer types configured on the NR can estimate the QoS correctly if the throughput measurement is done only based on the RLC data volume at the RLC layer.

In the NR, a PDU session can comprise of multiple QoS flows and SDAP entity can map one or more QoS flows onto a single DRB. The restriction in the QoS flow to DRB mapping is that one QoS flow is mapped onto only one DRB at a time. For radio bearers on the NR which is connected to 5GC, the QoS termination point on gNB is SDAP entity. Therefore, in order to verify QoS over an IP flow for bearers connected to 5GC, the throughput has to be measured at SDAP layer. For radio bearer on NR which is connected to EPC, the QoS termination point on eNB is PDCP entity. In order to verify QoS for an IP flow for bearers connected to EPC, the throughput has to be measured at PDCP entity. The method proposes that for the NR and the LTE bearers connected to 5GC, the throughput measurement has to be done based on the SDAP SDU at the SDAP layer. In certain embodiments according to this disclosure, the NR and the LTE bearers connected to EPC, the throughput measurement has to be done based on the PDCP SDU at the PDCP layer.

In case of split bearers, the PDCP throughput may not always be reflected as the sum of throughputs of the RLC entities it is connected to. For radio bearers for which PDCP duplication is configured, the throughput measurement has to be performed based on PDCP SDU volume. The method proposes that for the radio bearers configured with the PDCP duplication, the throughput measurement has to be done based on the PDCP SDU at the PDCP layer.

In certain embodiments according to this disclosure, in MR-DC cases, there are split bearers that can be configured with termination point on gNB/NR and the split leg on eNB/LTE. In such cases, in order to measure throughput over the DRB, the gNB has to consider the throughput provided over both the legs. Therefore, the gNB would add the throughput on NR RLC entity and LTE RLC entity. However, there is no throughput measurement performed on LTE RLC as per current release 15 specification. Provision to measure throughput based on RLC SDU on LTE, for split bearers terminating on gNB, has to be introduced. It is proposed that introduce throughput measurement based on RLC SDU at RLC layer on eNB, when split bearer with termination on gNB is configured to the UE (100).

The embodiments disclosed herein can be implemented through at least one software program running on at least one hardware device and performing network management functions to control the elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) for transition from a radio resource control (RRC) connected state in a wireless communication network, the method comprising:
   receiving, from a base station, an RRC reconfiguration message including configuration information regarding an indication of a preferred RRC state of the UE; and
   based on the configuration information, transmitting a UE assistance information message for indicating the preferred RRC state of the UE,
   wherein the UE assistance information message includes one of a plurality of indications including a first indication indicating that the preferred RRC state for the transition is an RRC idle state and a second indication indicating that the preferred RRC state for the transition is an RRC inactive state, and
   wherein in case that the UE prefers to transit from the RRC connected state and has no preferred RRC state for the transition, the transition from the RRC connected state is indicated, based on the UE assistance information message.

2. The method of claim 1, further comprising:
   activating a condition to trigger of the transmitting the UE assistance information message based on the configuration information, wherein the condition is one of: a timer based threshold and a counter based threshold.

3. The method of claim 1, further comprising:
   transmitting UE capability information indicating that the UE supports providing UE assistance information for the transition from the RRC connected state.

4. The method of claim 1, further comprising:
   identifying a timer for the transmitting the UE assistance information message, from the configuration information,
   wherein the UE assistance information message is transmitted to the base station based on an expiry of the timer.

5. A method of a base station for transition from a radio resource control (RRC) connected state in a wireless communication network, the method comprising:
   transmitting, to a user equipment (UE), an RRC reconfiguration message including configuration information regarding an indication of a preferred RRC state of the UE; and
   based on the configuration information, receiving a UE assistance information message for indicating the preferred RRC state of the UE,
   wherein the UE assistance information message includes one of a plurality of indications including a first indication indicating that the preferred RRC state for the transition is an RRC idle state and a second indication indicating that the preferred RRC state for the transition is an RRC inactive state, and
   wherein in case that the transition from the RRC connected state is preferred at the UE and there is no preferred RRC state for the transition at the UE, the transition from the RRC connected state is indicated, based on the UE assistance information message.

6. The method of claim 5, wherein a condition to trigger of transmission of the UE assistance information message is activated based on the configuration information at the UE, and wherein the condition is one of a timer based threshold and a counter based threshold.

7. The method of claim 5, further comprising:

receiving UE capability information indicating that providing UE assistance information for the transition from the RRC connected state is supported at the UE.

8. The method of claim 5, wherein a timer for transmission of the UE assistance information message is identified based on the configuration information at the UE, and wherein the UE assistance information message is received, based on an expiry of the timer.

9. A user equipment (UE) for transition from a radio resource control (RRC) connected state in a wireless communication network, the UE comprising:

a transceiver; and a processor coupled with the transceiver and configured to:

receive, from a base station, an RRC reconfiguration message including configuration information regarding an indication of a preferred RRC state of the UE, and based on the configuration information, transmit a UE assistance information message for indicating the preferred RRC state of the UE, wherein the UE assistance information message includes one of a plurality of indications including a first indication indicating that the preferred RRC state for the transition is an RRC idle state and a second indication indicating that the preferred RRC state for the transition is an RRC inactive state, and wherein in case that the UE prefers to transit from the RRC connected state and has no preferred RRC state for the transition, the transition from the RRC connected state is indicated, based on the UE assistance information message.

10. The UE of claim 9, wherein the processor is further configured to:

activate a condition to trigger of the transmitting the UE assistance information message based on the configuration information, wherein the condition is one of: a timer based threshold and a counter based threshold.

11. The UE of claim 9, wherein the processor is further configured to:

transmit UE capability information indicating that the UE supports providing UE assistance information for the transition from the RRC connected state.

12. The UE of claim 9, wherein the processor is further configured to:

identify a timer for the transmitting the UE assistance information message, from the configuration information, and wherein the UE assistance information message is transmitted to the base station based on an expiry of the timer.

13. A base station for transition from a radio resource control (RRC) connected state in a wireless communication network, the base station comprising:

a transceiver; and a processor coupled with the transceiver and configured to:

transmit, to a user equipment (UE), an RRC reconfiguration message including configuration information regarding an indication of a preferred RRC state of the UE, and based on the configuration information, receive a UE assistance information message for indicating the preferred RRC state of the UE, wherein the UE assistance information message includes one of a plurality of indications including a first indication indicating that the preferred RRC state for the transition is an RRC idle state and a second indication indicating that the preferred RRC state for the transition is an RRC inactive state, and wherein in case that the transition from the RRC connected state is preferred at the UE and there is no preferred RRC state for the transition at the UE, the transition from the RRC connected state is indicated, based on the UE assistance information message.

14. The base station of claim 13, wherein a condition to trigger of transmission of the UE assistance information message is activated based on the configuration information at the UE, and wherein the condition is one of a timer based threshold and a counter based threshold.

15. The base station of claim 13, wherein the processor is further configured to:

receive UE capability information indicating that providing UE assistance information for the transition from the RRC connected state is supported at the UE.

16. The base station of claim 13, wherein a timer for transmission of the UE assistance information message is identified based on the configuration information at the UE, and wherein the UE assistance information message is received, based on an expiry of the timer.

* * * * *